(12) United States Patent
Fuller

(10) Patent No.: US 9,342,553 B1
(45) Date of Patent: May 17, 2016

(54) IDENTIFYING DISTINCT COMBINATIONS OF VALUES FOR ENTITIES BASED ON INFORMATION IN AN INDEX

(71) Applicant: Google Inc., Mountain View, CA (US)

(72) Inventor: Alfred R. K. Fuller, San Carlos, CA (US)

(73) Assignee: GOOGLE INC., Mountain View, CA (US)

( * ) Notice: Subject to any disclaimer, the term of this patent is extended or adjusted under 35 U.S.C. 154(b) by 360 days.

(21) Appl. No.: 13/892,215

(22) Filed: May 10, 2013

Related U.S. Application Data

(60) Provisional application No. 61/714,155, filed on Oct. 15, 2012, provisional application No. 61/646,349, filed on May 13, 2012.

(51) Int. Cl.
*G06F 17/30* (2006.01)
(52) U.S. Cl.
CPC .............................. *G06F 17/30424* (2013.01)
(58) Field of Classification Search
CPC .................. G06F 17/30917; G06F 17/30321; G06F 17/30386; G06F 17/30699; G06F 17/30477; G06F 17/30457; G06F 17/30424
See application file for complete search history.

(56) References Cited

U.S. PATENT DOCUMENTS

| | | | |
|---|---|---|---|
| 5,511,186 A * | 4/1996 | Carhart et al. | |
| 5,742,806 A * | 4/1998 | Reiner et al. | |
| 2001/0037329 A1 * | 11/2001 | Huffman et al. | 707/3 |
| 2003/0140035 A1 * | 7/2003 | Burrows | 707/3 |
| 2004/0153435 A1 * | 8/2004 | Gudbjartsson et al. | 707/1 |
| 2007/0185838 A1 * | 8/2007 | Peh et al. | 707/3 |
| 2008/0010302 A1 * | 1/2008 | Fontoura et al. | 707/100 |
| 2011/0119249 A1 * | 5/2011 | Flatz et al. | 707/714 |
| 2013/0282765 A1 * | 10/2013 | Bhattacharjee et al. | 707/803 |

* cited by examiner

*Primary Examiner* — Shiow-Jy Fan
(74) *Attorney, Agent, or Firm* — Morgan, Lewis & Bockius LLP

(57) ABSTRACT

A server system having one or more processors and memory receives, from a requestor, a select distinct query. In response to the query, the server system identifies a set of index portions according to requestor-specified filter criteria. The server system identifies one or more distinct value combinations for entities satisfying the filter criteria, including: obtaining an initial value of a query cursor; retrieving candidate value combinations; comparing candidate value combinations to identify distinct value combinations, if any, in accordance with the query; and updating the current value of the query cursor. The server system repeats the retrieving candidate value combinations and the comparing candidate value combinations one or more times for the set of index portions until at least a respective distinct value combination has been identified and transmits information corresponding to the respective distinct value combination to the requestor.

20 Claims, 16 Drawing Sheets

IDENTIFYING DISTINCT COMBINATIONS OF VALUES FOR ENTITIES BASED ON INFORMATION IN AN INDEX

RELATED APPLICATIONS

This application claims priority to U.S. Provisional Patent Application No. 61/714,155, filed Oct. 15, 2012, and U.S. Provisional Patent Application No. 61/646,349, filed May 13, 2012, both of which are hereby incorporated by reference in their entireties.

BACKGROUND OF THE INVENTION

Datastore server systems store large volumes of data and receive numerous queries from requestors (for example, clients and applications). The queries received by datastore server systems are often complex. Processing these queries (e.g., queries to identify distinct combinations of values for entities in a database) is often resource intensive due to the quantity of data required to process them.

SUMMARY

Efficiency of processing complex queries using a large quantity of data is improved by efficient data retrieval and data storage. One approach to improving efficiency of data retrieval and data storage involves organizing data in the form of sorted indexes generated from an underlying schemaless database.

While these sorted indexes increase speed and efficiency of data retrieval for efficient query-processing, the query-processing capabilities of these sorted indexes (e.g., the types of queries that can be processed efficiently using these indexes) differ from those of some conventional relational databases. Standard approaches used for query-processing in relational databases may be incompatible with the sorted indexes and/or do not take advantage of the increased efficiency of searches that use the sorted indexes. As such, novel approaches and methods are needed to efficiently process queries using sorted indexes. An example of a query that requires specialized processing methodology when implemented using sorted indexes is a 'select distinct' query (for example, a query requesting distinct values of a property of entities satisfying one or more logical criteria: e.g., a query requesting a list of distinct names of lawyers in California; State='California' AND Occupation='Lawyer'; Select Distinct 'Name').

In some embodiments, a method is performed at a server system having one or more processors and memory storing one or more programs for execution by the one or more processors so as to perform the method. The method includes receiving, from a requestor, a query for retrieving information corresponding to distinct value combinations of one or more properties for entities satisfying requestor-specified filter criteria. In response to the query, the method includes identifying a set of index portions including two or more index portions in accordance with the requestor-specified filter criteria, where index entries in the set of index portions are sorted in a predefined sort order in accordance with value combinations of the one or more properties. The method further includes identifying one or more distinct value combinations of the one or more properties for entities satisfying the requestor-specified filter criteria, where the identifying includes obtaining an initial value of a query cursor, and a respective value of the query cursor corresponds to a respective value combination for the one or more properties. The method further includes retrieving candidate value combinations, including, for each respective index portion in the set of index portions, retrieving a respective candidate value combination of the one or more properties that is equal or sequentially adjacent, in the respective index portion, to a current value of the query cursor. The method also includes, after retrieving candidate value combinations, comparing candidate value combinations, including comparing a plurality of the respective candidate value combinations so as to identify distinct value combinations, if any, from the plurality of respective candidate value combinations in accordance with the query. The method further includes updating the current value of the query cursor and repeating the operations of retrieving candidate value combinations and the comparing candidate value combinations one or more times for the set of index portions until at least a respective distinct value combination has been identified. The method further includes transmitting information corresponding to the respective distinct value combination to the requestor.

In accordance with some embodiments, a computer system (e.g., a client system or server system) includes one or more processors, memory, and one or more programs; the one or more programs are stored in the memory and configured to be executed by the one or more processors and the one or more programs include instructions for performing the operations of the method described above. In accordance with some embodiments, a non-transitory computer readable storage medium has stored therein instructions which when executed by one or more processors, cause a computer system (e.g., a client system or server system) to perform the operations of the methods described above.

BRIEF DESCRIPTION OF THE DRAWINGS

For a better understanding of the disclosed embodiments, reference should be made to the Description of Embodiments below, in conjunction with the following drawings in which like reference numerals refer to corresponding parts throughout the figures.

DESCRIPTION OF EMBODIMENTS

It will be understood that, although the terms "first," "second," etc. are optionally used herein to describe various elements, these elements should not be limited by these terms. These terms are only used to distinguish one element from another. For example, a first entity could be termed a second entity, and, similarly, a second entity could be termed a first entity, without changing the meaning of the description, so long as all occurrences of the "first entity" are renamed consistently and all occurrences of the second entity are renamed consistently. The first entity and the second entity are both entities, but they are not the same entity.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is optionally construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" is optionally construed to mean "upon determining" or "in response to determining" or "in accordance with a determination" or "upon detecting" or "in response to detecting" that the stated condition precedent is true, depending on the context.

The embodiments described below include client, application server and datastore server systems, which typically inter-operate in a distributed client-server system and corresponding methods of responding to a select distinct query.

Figure 1:
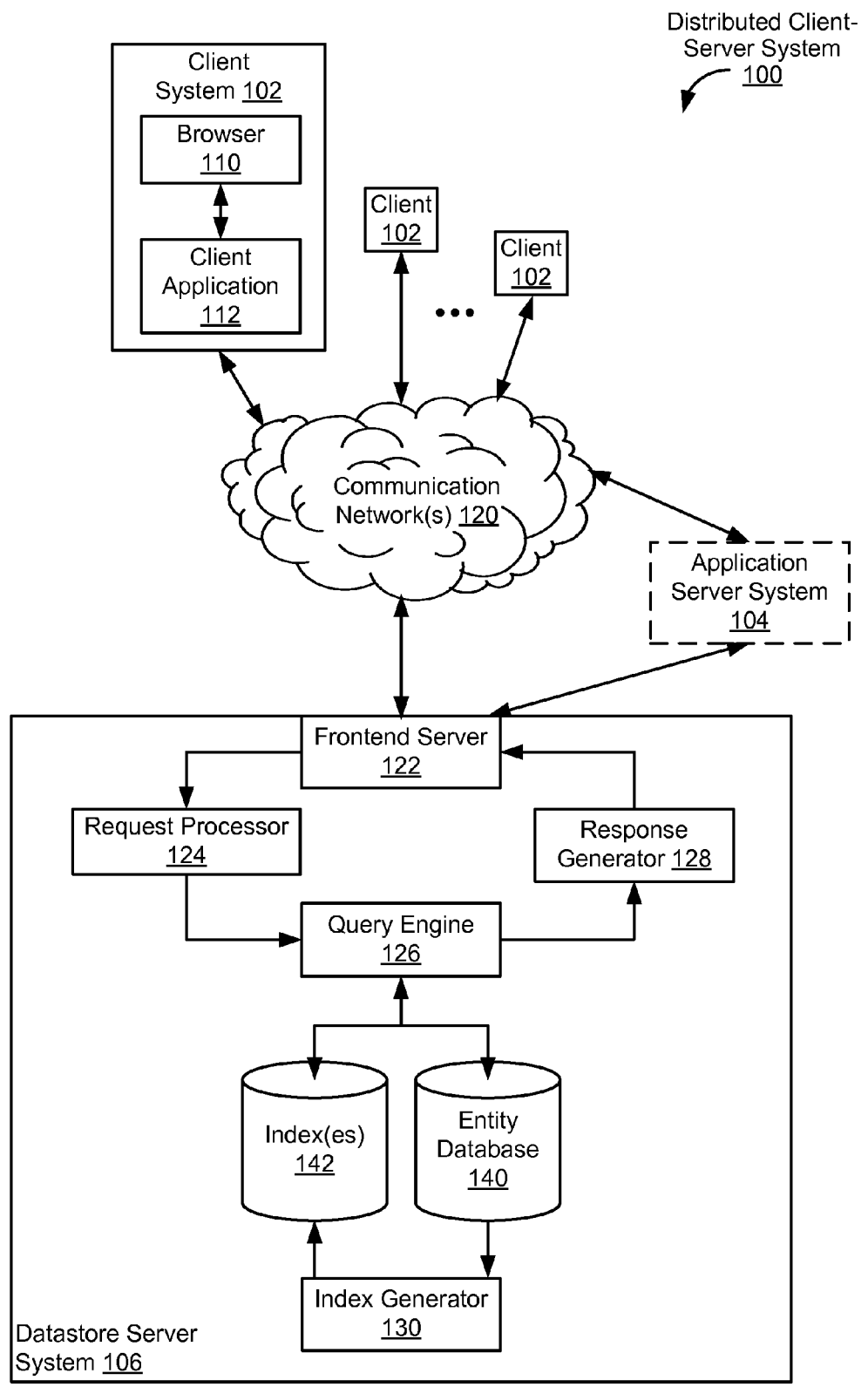
FIG. 1 is a block diagram illustrating a distributed client-server system, in accordance with some embodiments.

FIG. 1 includes a block diagram illustrating an example of a distributed client-server system 100 for sending and responding to requests based on an empirically-determined schema for a schemaless database. System 100 includes one or more Client System(s) 102 (also referred to herein as "Client 102"), an Application Server System 104 (also referred to herein as "App Server 104"), a Datastore Server System 106 (also referred to herein as "Datastore Server 106") and a Communication Network 120 for connecting Clients 102, App Server 104 and Datastore Server 106 to each other. Communication Network 120 optionally includes the Internet, one or more local area networks (LANs), one or more wide area networks (WANs), other types networks, or a combination of such networks.

Client 102 optionally includes Browser 110 and/or Client Application 112. Browser 110 can be a general purpose Internet browser (sometimes called a Web browser) having a browser window used for displaying an application interface. A web application for submitting a data request is optionally implemented using hypertext markup language (HTML) or extensible markup language (XML) elements that are rendered by Browser 110. Alternatively, a data request is, optionally, submitted via a standalone Client Application 112. After a user submits a data request through Browser 110 or standalone Client Application 112, Client 102 relays the request to Datastore Server 106 via Communication Network 120. Datastore Server 106 processes the data request and transfers results and, optionally, a set of display information back to Client 102. Client Application 112 and/or Browser 110 use(s) the results and display information to render an updated application state at Client 102.

In some implementations, Datastore Server 106 includes Frontend Server 122, Request Processor 124, Query Engine 126, Response Generator 128, Index Generator 130, Entity Database 140, one or more Index(es) 142. Index Generator 130 processes information about the entities that are stored in Entity Database 140 to produce Index(es) 142 for use by Query Engine 126 when performing a search query. Alternatively or in addition, Index Generator 130 retrieves information about entities from a remote source such as a remote database or web crawler that systematically retrieves information from a plurality of remote sources (e.g., websites). These operations are typically performed by Index Generator 130 prior to receiving the request at Datastore Server 106. In addition, Index Generator 130 typically continues to update Index(es) 142 between requests or queries, and in some implementations or some circumstances, continues to update Index(es) 142 concurrently with the processing of requests or queries.

Frontend Server 122 relays requests from Clients 102 to Request Processor 124, which optionally processes a request by selecting an order to apply filters and sort orders specified in the request and transmits the processed request to Query Engine 126. The Request Processor 124 processes the request so as to improve the performance characteristics of the request (e.g., by determining an order to apply filters that reduces the time to perform the request and/or reduces the maximum or total processor usage). Query Engine 126 identifies, in Index(es) 142, indexes and index portions adapted for responding to the request and performs the request on the identified indexes and/or index portions to generate a response.

Response Generator 128 generates a response based on the identified search results. Response Generator 128 also, optionally, determines display information for the response. The response and, optionally, display information is passed to Frontend Server 122, which in turn passes the results to Client 102 via Communication Network 120 or to App Server 104 for display at Client 102 (e.g., via Browser 110 or Client Application 112).

Figure 2:
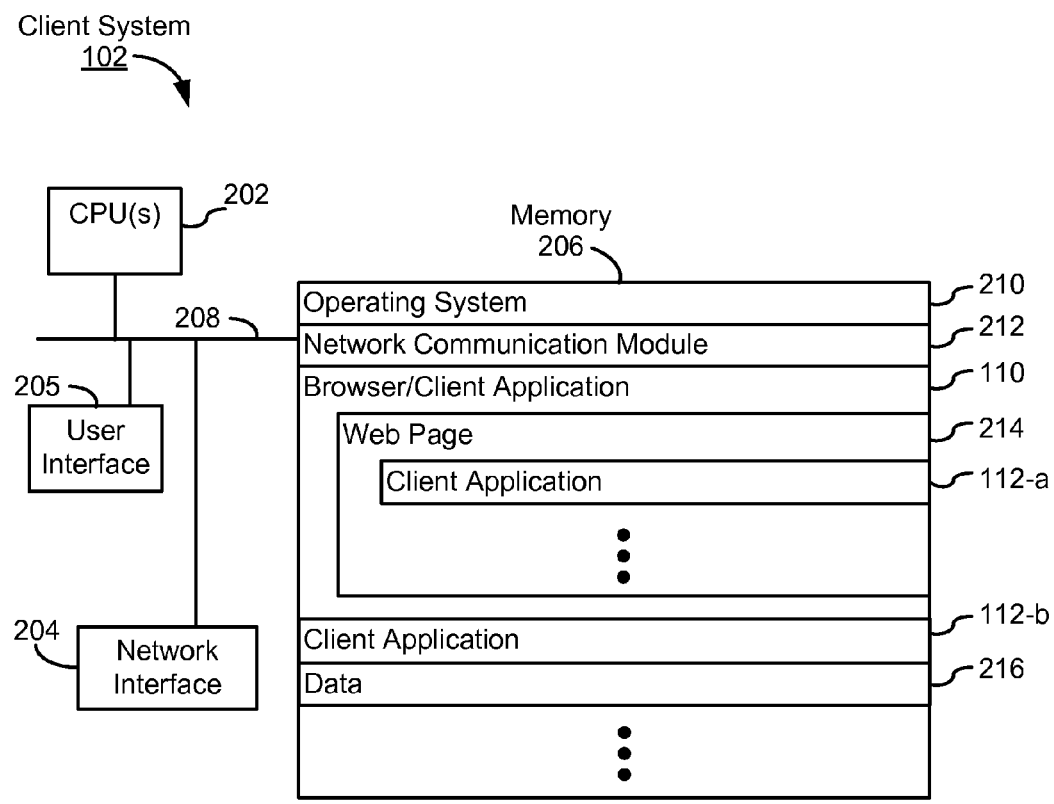
FIG. 2 is a block diagram illustrating a client system, in accordance with some embodiments.

FIG. 2 is a block diagram illustrating a Client System 102 in accordance with some embodiments. Client 102 typically includes one or more processing units CPU(s) 202, one or more communications interfaces such as Network Interface 204, Memory 206, User Interface 205 comprising a display device and a keyboard, mouse, touchpad, touchscreen or other input device, and one or more Communication Buses 208 for interconnecting these components. Communication Buses 208 optionally include circuitry (sometimes called a chipset) that interconnects and controls communications between system components. Memory 206 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 206 optionally includes one or more storage devices remotely located from the CPU(s) 202. Memory 206, or alternatively the non-volatile memory device(s) within Memory 206, comprises a non-transitory computer readable storage medium. In some embodiments, Memory 206 or alternatively the non-transitory computer readable storage medium stores the following programs, modules and data structures, or a subset thereof:

Operating System 210 that includes procedures for handling various basic system services and for performing hardware dependent tasks;

Network Communication Module (or instructions) 212 that is used for connecting Client System 102 to other computers (e.g., App Server 104 or Datastore Server 106) via Network Interface 204 (wired or wireless) and one or more Communication Networks 120 (FIG. 1), such as the Internet, other wide area networks, local area networks, metropolitan area networks, and so on;

Web Browser 110 for loading web pages such as a Web Page 214, which optionally includes code for executing a Client Application 112-a as an embedded application in Web Page 214, where Client Application 112-a sends requests to Datastore Server 106 or to App Server 104 and displays data received from Datastore Server 106 or from App Server 104 (e.g., information corresponding to an empirically-determined schema for a schemaless entity database stored at Datastore Server 106);

dedicated Client Application 112-b (e.g., a stand-alone email client or a desktop search application) for sending requests to Datastore Server 106 or to App Server 104 and displaying data received from Datastore Server 106 or from App Server 104 (e.g., information corresponding to an empirically-determined schema for a schemaless entity database stored at Datastore Server 106); and optionally, Data 216 such as cached data (e.g., recently accessed entities, responses to prior requests, etc.), and/or information about empirically-determined schema(s) received from Datastore Server 106 or App Server 104.

Each of the above identified elements are optionally stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules are optionally combined or otherwise re-arranged in various embodiments. In some embodiments, Memory 206 optionally stores a subset of the modules and data structures identified above. Furthermore, Memory 206 optionally stores additional modules and data structures not described above.

Figure 3:
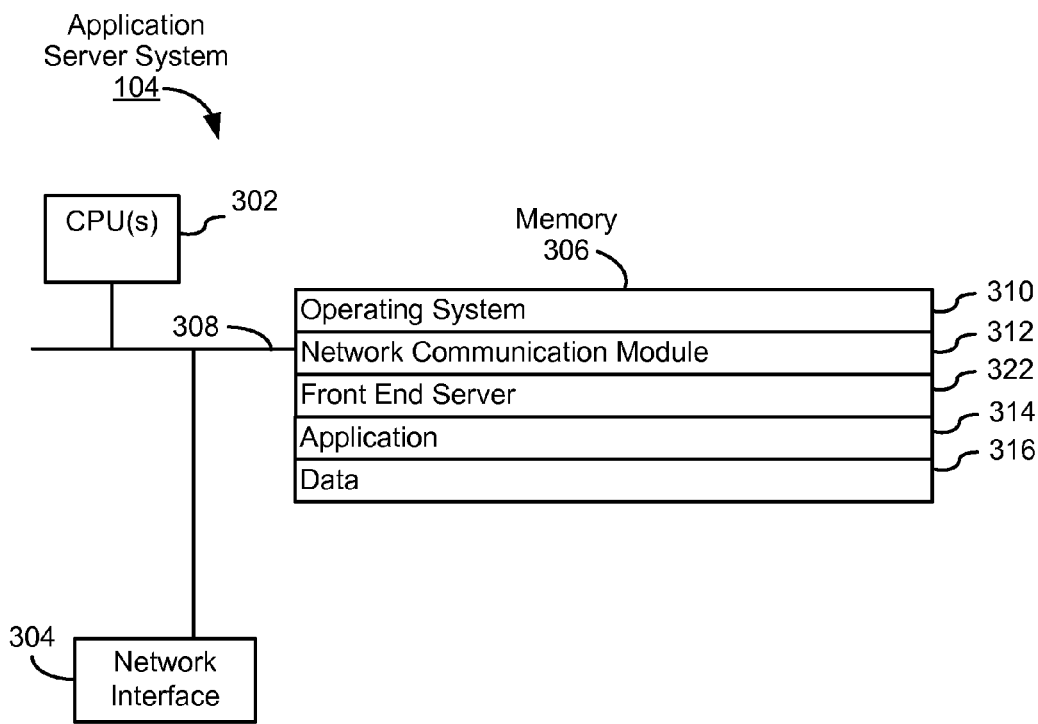
FIG. 3 is a block diagram illustrating an application server system, in accordance with some embodiments.

FIG. 3 is a block diagram illustrating an Application Server System 104 (also referred to herein as "App Server 104") in accordance with some embodiments. App Server 104 typically includes one or more processing units CPU(s) 302, one or more communications interfaces such as Network Interface 304, Memory 306, and one or more Communication Buses 308 for interconnecting these components. Communication Buses 308 optionally include circuitry (sometimes called a chipset) that interconnects and controls communications between system components. Memory 306 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 306 optionally includes one or more storage devices remotely located from the CPU(s) 302. Memory 306, or alternatively the non-volatile memory device(s) within Memory 306, comprises a non-transitory computer readable storage medium. In some embodiments, Memory 306 or alternatively the non-transitory computer readable storage medium stores the following programs, modules and data structures, or a subset thereof:

Operating System 310 that includes procedures for handling various basic system services and for performing hardware dependent tasks;

Network Communication Module (or instructions) 312 that is used for connecting App Server 104 to other computers (e.g., Client 102 or Datastore Server 106) via Network Interface 304 (wired or wireless), and one or more Communication Networks 120 (FIG. 1), such as the Internet, other wide area networks, local area networks, metropolitan area networks, and so on;

Frontend Server 322 for coordinating communication between App Server 104, Clients 102, Datastore Server 106 and any other computer systems with which App Server 104 communicates;

Application 314 for processing requests from Clients 102 and relaying the requests to Datastore Server 106 corresponding to the client-specified requests, in some embodiments, Application 314 is a backend of Client Application 112 at Client 102, thus Client 102 interacts primary with Application 314, and Application 314 makes specific data requests to Datastore Server 106 that enable Datastore Server 106 to respond to the client-specified requests from Client 102;

optionally, Data 316 such as cached data (e.g., recently accessed entities, responses to prior requests, etc.), and/or information about empirically-determined schema(s) received from Datastore Server 106.

Each of the above identified elements are optionally stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules are optionally combined or otherwise re-arranged in various embodiments. In some embodiments, Memory 306 optionally stores a subset of the modules and data structures identified above. Furthermore, Memory 306 optionally stores additional modules and data structures not described above.

Although FIG. 3 shows an "Application Server System" 104, FIG. 3 is intended more as functional description of the various features which are optionally present in a set of servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement an Application Server System 104 and how features are allocated among them will vary from one implementation to another, and optionally depends in part on the amount of data traffic that the system must handle during peak usage periods as well as during average usage periods.

Figure 4:
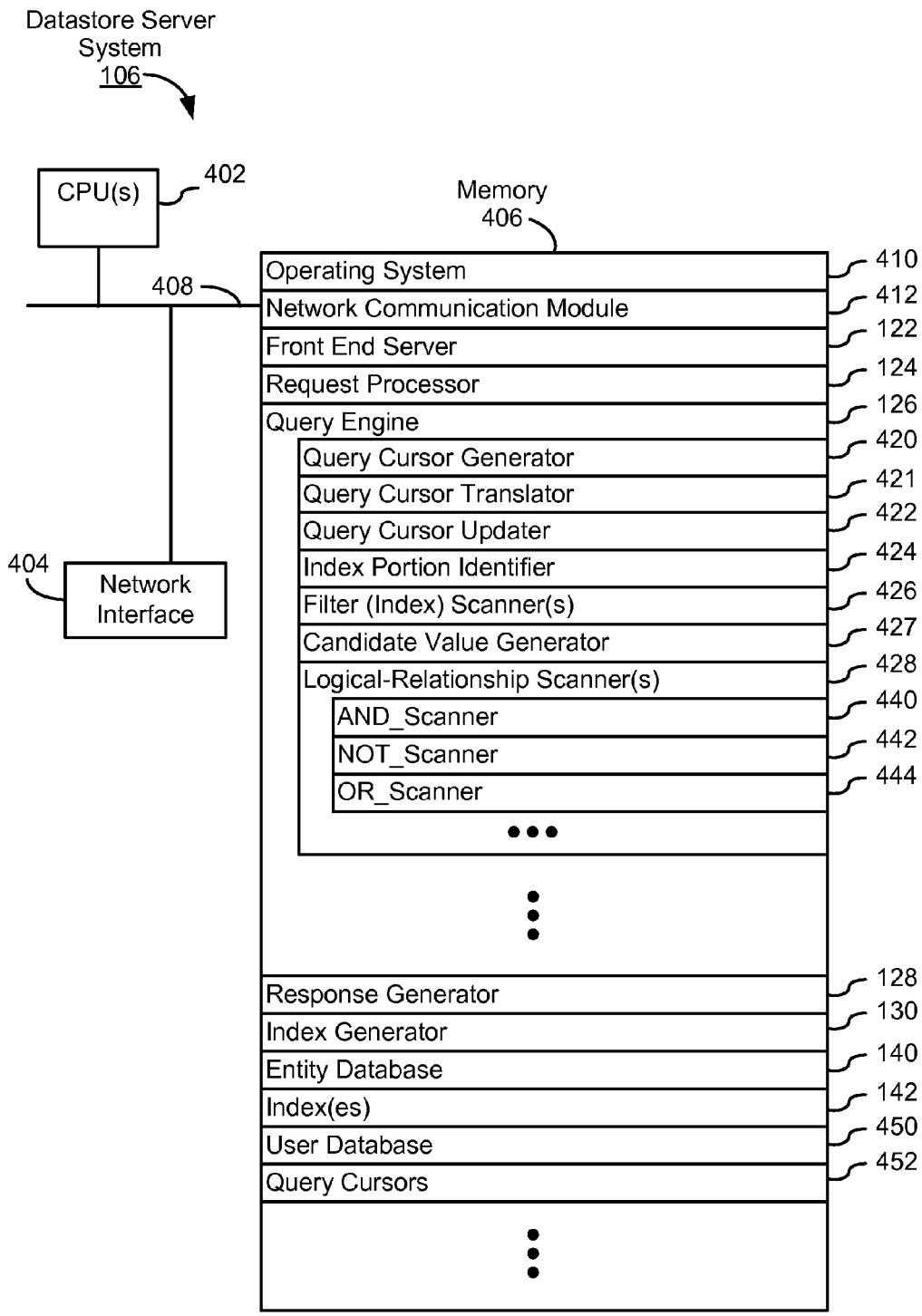
FIG. 4 is a block diagram illustrating a datastore server system, in accordance with some embodiments.

FIG. 4 is a block diagram illustrating a Datastore Server System 106 in accordance with some embodiments. Datastore Server System 106 typically includes one or more processing units CPU(s) 402, one or more communications interfaces such as Network Interface 404, Memory 406, and one or more Communication Buses 408 for interconnecting these components. Communication Buses 408 optionally include circuitry (sometimes called a chipset) that interconnects and controls communications between system components. Memory 406 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 406 optionally includes one or more storage devices remotely located from the CPU(s) 402. Memory 406, or alternatively the non-volatile memory device(s) within Memory 406, comprises a non-transitory computer readable storage medium. In some embodiments, Memory 406 or alternatively the non-transitory computer readable storage medium stores the following programs, modules and data structures, or a subset thereof:

Operating System 410 that includes procedures for handling various basic system services and for performing hardware dependent tasks;

Network Communication Module (or instructions) 412 that is used for connecting Datastore Server 106 to other computers (e.g., Client 102 or App Server 104) via Network Interfaces 404 (wired or wireless) and one or more Communication Networks 120 (FIG. 1), such as the Internet, other wide area networks, local area networks, metropolitan area networks, and so on;

Frontend Server 122 for coordinating communication between Datastore Server 106, Clients 102, App Server 104 and any other computer systems with which Datastore Server 106 communicates;

Request Processor 124 for converting a search query received from Client 102 into a search query to be executed by Query Engine 126; for multi-step search queries, the converting optionally includes revising the order and/or composition of the steps so as to improve the speed and/or efficiency of performing the search query (e.g., by reducing the number of index scans used to produce the result and/or performing steps that are likely to eliminate a large number of non-matching entities earlier in the search process);

Query Engine 126 for performing the search query by identifying index portions and searching the index portions using the search query;
  Query Cursor Generator 420 for generating a query cursor that indicates a location in the index portions at which Query Engine 126 stopped searching (e.g., stopped retrieving identifiers for matching index entries), the query cursor is, optionally, sent along with results to serve as a 'bookmark' if the Client decides to resume the search at the stopping point;
  Query Cursor Translator 421 for receiving, along with a new search query, a query cursor generated in response to a prior search query, decomposing the query cursor and determining a corresponding new query cursor that indicates a location in index portions associated with the new search query corresponding to a stopping point in the index portions associated with the prior search query;
  Query Cursor Updater 422 for making a determination as to whether a query cursor needs to be updated and upon determining that the query cursor needs to be updated, Query Cursor Updater 422 updates the query cursor.
  Index Portion Identifier 424 for identifying index portions that are adapted for responding to a search query (e.g., index portions that match all of the filters of a search query and are sorted in same sort order, such as a sort order specified by the search query);
  one or more Filter (Index) Scanners 426 for scanning through an index or index portion to retrieve an identifier of one or more next matching results (e.g., matching index entries that are sequentially adjacent to or otherwise subsequent to the last matching index entry or query cursor position in the sort order) in the index or index portion;
  Candidate Value Generator 427 for retrieving candidate value combinations; in some implementations, for an index portion, Candidate Value Generator 427 retrieves index entries having a first section (including values for one or more properties) and a second section (including values for one or more additional properties) and, after retrieving the index entries, identifies a combination of the values in the first section and the second section as the candidate value combination for the index portion (e.g., Candidate Value Generator 427 truncates index entries retrieved from different indexes so that comparable portions of index entries from otherwise incompatible indexes can be compared with each other); and
  one or more Logical-Relationship Scanners 428 for retrieving identifiers of matching entities from the index portions identified by Index Portion Identifier 424 in accordance with the received search query, the Logical-Relationship Scanners 428 typically include one or more of an AND_Scanner 440 (described in greater detail below with reference to FIG. 5C), a NOT_Scanner 442 and an OR Scanner 444 (described in greater detail below with reference to FIG. 5D);

Response Generator 128 for organizing information concerning matching entities identified by Query Engine 126 and generating display information to be transmitted to Client 102, where the display information specifies formatting of the search results at Client 102;

Index Generator 130 for generating indexes for use in executing search queries, in some implementations Index Generator 130 generates a large number of indexes (e.g., at least one index for each property that can be used to sort and/or filter search results) so that for each possible combination of filters and sort orders in a search query, there exists an index including an index portion where the index entries matching the combination of filters are arranged in a contiguous block of index entries sorted in the sort order;

optionally, Entity Database 140 storing entities or information about entities;

one or more Indexes 142 which store information about entities and properties of the entities, typically the Indexes 142 are each sorted in accordance with values of the properties for the entities, as described in greater detail below with reference to FIGS. 5A-5B;

optionally, User Database 450 storing information about users and user search preferences, in some embodiments when the entities are user specific (e.g., a collection of a user's photos, emails or other documents), the user database identifies which entities and indexes the user has authority to access; User Database 450, optionally, stores addition user account information as well; and optionally, Query Cursors 452 received from Client 102 or generated by Query Cursor Generator 420 and sent to Client 102 in response to prior search queries, alternatively query cursors are not stored at Datastore Server 106 and are instead received from Client 102 on an as needed basis in conjunction with requests to perform search queries using the query cursors.

Each of the above identified elements are optionally stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules are optionally combined or otherwise re-arranged in various embodiments. In some embodiments, Memory 406 optionally stores a subset of the modules and data structures identified above. Furthermore, Memory 406 optionally stores additional modules and data structures not described above.

Although FIG. 4 shows a "Datastore Server System" 106, FIG. 4 is intended more as functional description of the various features which are optionally present in a set of servers than as a structural schematic of the embodiments described herein. In practice, and as recognized by those of ordinary skill in the art, items shown separately could be combined and some items could be separated. For example, some items shown separately in FIG. 4 could be implemented on single servers and single items could be implemented by one or more servers. The actual number of servers used to implement a Datastore Server 106 and how features are allocated among them will vary from one implementation to another, and optionally depends in part on the amount of data traffic that the system must handle during peak usage periods as well as during average usage periods.

Responding to 'Select Distinct' Queries Using Indexes and Index Portions

Figures 5A, 5B:
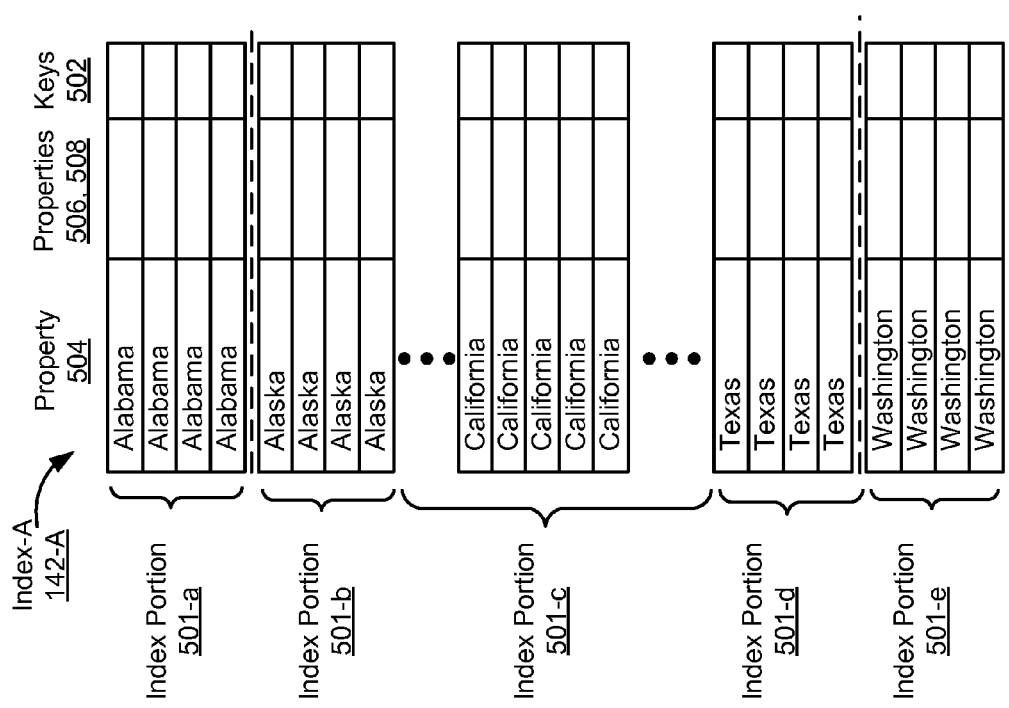
FIGS. 5A-5B are block diagrams illustrating index(es) including index portions for entities stored in an entity database at the datastore server system, in accordance with some embodiments.

FIGS. 5A-5B illustrate examples of index(es) (e.g., Index-A 142-A and Index-B 142-B) generated from Entity Database 140 (FIG. 1 and FIG. 4). As shown in FIG. 5A, Index-A 142-A includes a plurality of index entries (rows) sorted in accordance with values of Property 504, values of Properties 506, 508, and Key 502, in that order (e.g., the rows in the indexes in FIGS. 5A and 5B are sorted in accordance with values in the columns from left to right). Similarly, as shown in FIG. 5B, Index-B 142-B includes a plurality of index entries (rows) sorted in accordance with values of Property 514, values of Properties 516, 518, and Key 512, in that order.

In other words, Index-A 142-A and Index-B 142-B are obtained by sorting the index entries by values of their properties, and within portions of an index that correspond to a particular value of a property sorting the index entries by values of another property or key. For example, Index-A 142-A, has index entries sorted by values of Property 504. For index entries having a common value of Property 504 (e.g., California), the index entries are further sorted by their values of Property 506, and so on. In other words, for an index sorted by more than one property, index entries are sorted by value combinations, obtained from a concatenation of values of successive properties in the sort order. Index-A 142-A and Index-B 142-B are arranged (e.g., sorted according to values of properties according to a sort order) in Index Portions 501 and Index Portions 511, respectively. When Datastore Server 106 receives a query from a requestor (e.g., Client 102 or App Server 104), Datastore Server 106 (e.g., using Index Portion Identifier 424 of Query Engine 126, FIG. 4) selects index portions from the respective indexes based on filter criteria specified in the query. For example, shown in FIGS. 5C and 5D are Index Portion 501-c (e.g., index entries in Index A where Property 504='California') and Index Portion 511-c (e.g., index entries in Index B where Property 514='Lawyer'), selected from Index-A 142-A (FIG. 5A) and Index-B 142-B (FIG. 5B) respectively based on filter criteria (State='California' AND Occupation='Lawyer') specified in the example queries (Query 520-A, FIG. 5C; and Query 520-B, FIG. 5D).

Figure 5C:
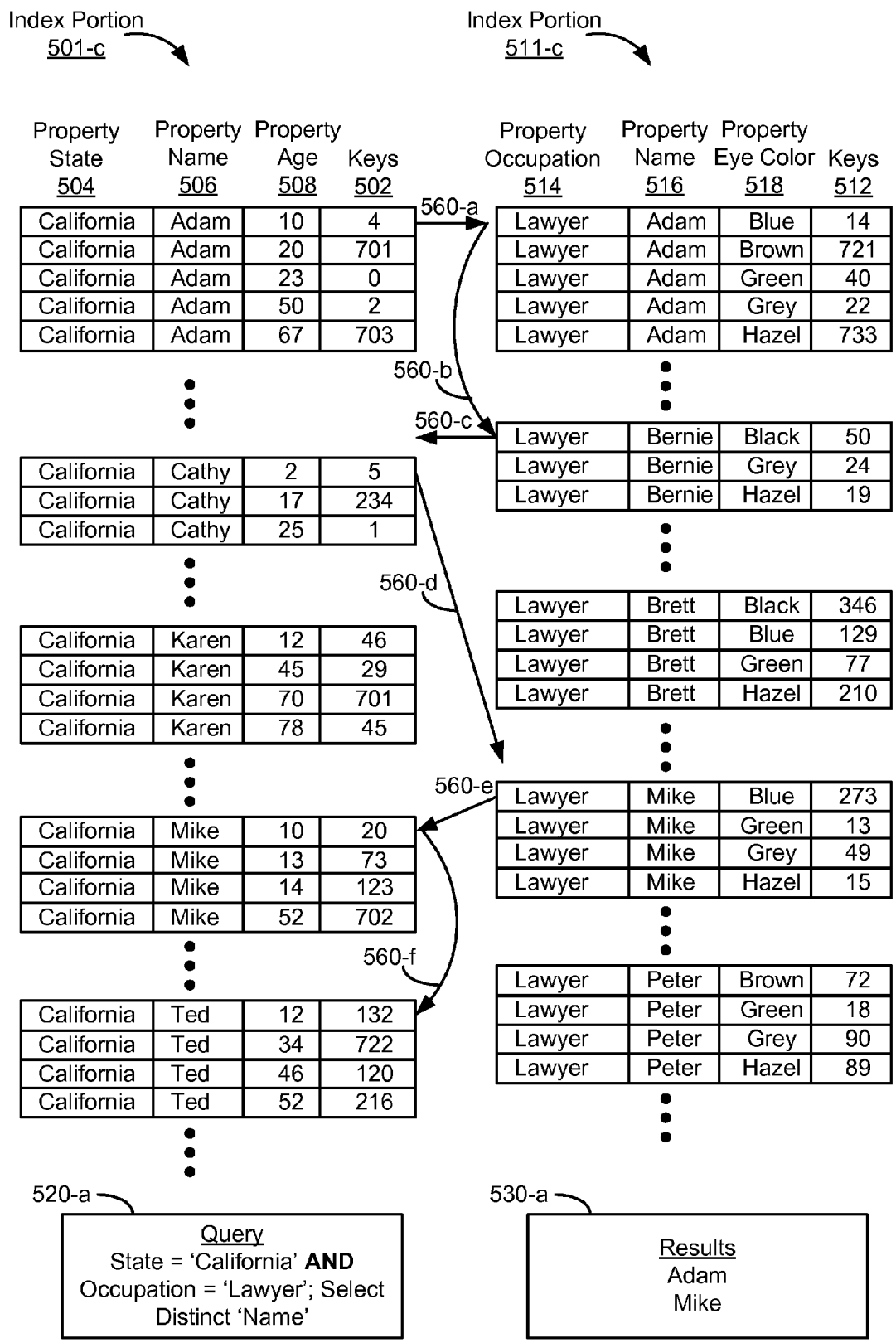
FIG. 5C is a block diagram illustrating a method for identifying distinct property values in index portions of indexes when a logical relationship between operands of the search query is a Boolean AND, in accordance with some embodiments.
Figure 5D:
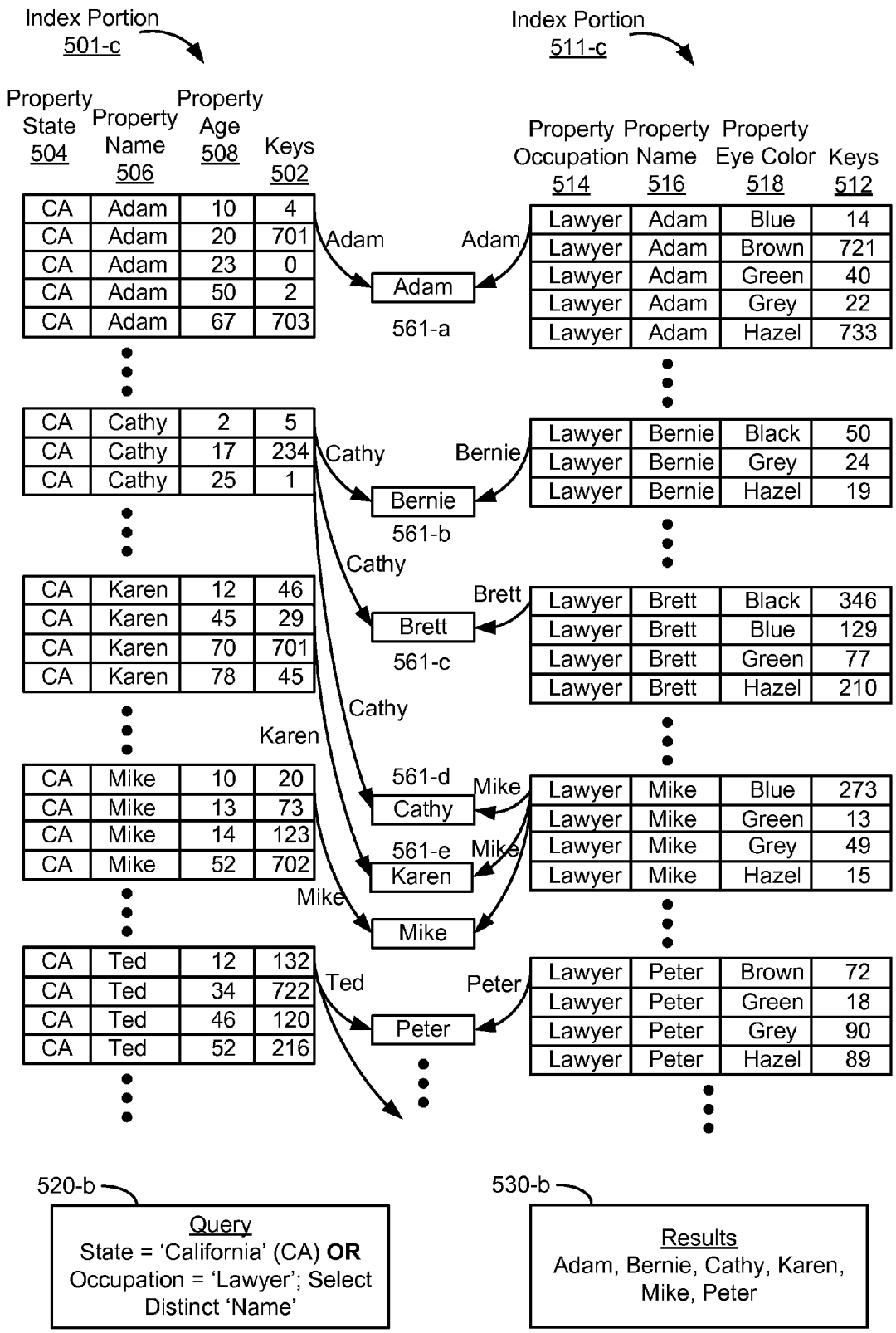
FIG. 5D is a block diagram illustrating a method for identifying distinct property values in index portions of indexes when a logical relationship between operands of the search query is a Boolean OR, in accordance with some embodiments.

FIG. 5C illustrates, the execution of a requestor-specified 'select distinct' query (e.g., Query 520-a). Query 520-a requests distinct names (distinct values of Property='Name') of lawyers in the state of California (State='California' AND Occupation='Lawyer'). Since the filter criteria in Query 520-a (State='California' AND Occupation='Lawyer'; Select Distinct 'Name') specify filters including State='California' and Occupation='Lawyer,' Datastore Server 106 selects Index Portion 501-c (corresponding to State='California') from Index-A 142-A and Index Portion 511-c (corresponding to Occupation='Lawyer') from Index-B 142-B for the execution of Query 520-a.

The query (Query 520-a) requests retrieval of distinct value combinations of one or more properties (in this example, distinct values of Property='Name') for which the conditions stated in the query are true. Based on the received query (in this example, Query 520-a), Datastore Server 106 identifies indexes sorted by the properties specified in the query (e.g., Property 504, 506 in Index-A 142-A and Property 514, 516 in Index-B 142-B, FIGS. 5A-5B) and from the identified indexes, Datastore Server 106 (e.g., using Index Portion Identifier 424 of Query Engine 126, FIG. 4) identifies index portions (e.g., Index Portion 501-c and Index Portion 511-c) to be used for the execution of the query. Datastore Server 106 (e.g., using one or more Filter Scanners 426, FIG. 4) then identifies distinct values of the specified property (e.g., distinct values of Property='Name') that are present in the one or more index portions (e.g., Index Portion 501-c and Index Portion 511-c) used to process the query, as valid results. In some implementations the processing of the query depends on the logical relationship specified in the select distinct query. Two examples of processing a select distinct query are given with reference to different logical relationships in FIGS. 5C-5D below.

In FIG. 5C, the logical AND operator specifies that distinct values of a property (in this example, Property='Name') are to be retrieved as valid search results when the distinct values occur in both Index Portion 501-c and in Index Portion 511-c. In some embodiments, Datastore Server 106 performs or executes the query in one or more iterations. In some of these embodiments, for a single iteration, Datastore Server 106 identifies candidate values from the two or more index portions used for execution of the query and then identifies a distinct candidate value combination for that iteration from the identified candidate value combinations. In some embodiments, in order to facilitate the process of iteratively traversing through and between two or more sorted index portions, Datastore Server 106 maintains and updates a 'current value' of a query cursor (as will be explained below with reference to the illustrative Query 520-a and Query 520-b) as a common reference across the index portions used for the execution of the query. The current value of the query cursor, used in these embodiments, keeps track of the most recent property value identified in a current index portion (most recently traversed), so as to enable Datastore Server 106 to traverse subsequent index portions starting at a property value determined in relation to the current value of the query cursor. The use of the current value of the query cursor as a starting point for traversing one or more index portions improves efficiency of query-execution by obviating the need to traverse segments of the one or more index portions that occur prior to the position corresponding to the current value of the query cursor.

In some embodiments, in order to execute Query 520-*a*, as shown in FIG. 5C, Datastore Server 106 starts with the first value (also referred to here as a 'candidate value') of Property 506 of an index entry in Index Portion 501-*c*. For example, in FIG. 5C, the value Name='Adam' is obtained by Datastore Server 106 as an initial value of the query cursor. Alternatively, in some embodiments, the initial value of the query cursor is initialized to a predefined value that is a first value in the sort order (e.g., a 'null character). Datastore Server 106 then proceeds (560-*a*) to Index Portion 511-*c* to identify the first index entry with Property 516 having a property value (or candidate value) greater than or equal to the current value of the query cursor (e.g., 'Adam'). Upon finding an index entry with value of Property 516='Adam' in Index Portion 511-*c*, Datastore Server 106 identifies 'Adam' as a distinct value and a valid result to the Query 520-*a* (State='California' AND Occupation='Lawyer'; Select Distinct 'Name'), because there is a Lawyer in the state of California with the name Adam.

Datastore Server 106 then traverses (560-*b*) Index Portion 511-*c* to find the first index entry having a property (Property 516) value greater than and distinct from the current value of the query cursor (e.g., 'Adam'). Alternatively, Datastore Server 106 increments the query cursor (e.g., by appending the null character to the current value of the query cursor) and then traverses Index Portion 511-*c* to find the first index entry having a property value greater than or equal to the current value of the query cursor (e.g., Adam+null character). In the example shown in FIG. 5C, the next distinct value (or 'candidate value') of Property 516 in Index Portion 511-*c* is identified as Name='Bernie.' Datastore Server 106 updates the current value of the query cursor to reflect the next candidate value in the current index portion (in this case, to Name='Bernie'). Datastore Server 106 then proceeds (560-*c*) to Index Portion 501-*c* to look for the first index entry with Property 506 having a property value greater than or equal to the current value of the query cursor (e.g., 'Bernie'). Upon finding the first index entry with value of Property 516='Cathy' in Index Portion 511-*c* as the first index entry having a property value not equal to the current value of the query cursor (e.g., a value greater than 'Bernie'), Datastore Server 106 does not identify 'Bernie' as a valid search result to Query 520-*a*. However, Datastore Server 106 identifies 'Cathy' as a candidate value and updates the current value of the query cursor to 'Cathy.'

Datastore Server 106 then proceeds (560-*d*) to Index Portion 511-*c* to identify the first entry with Property 516 having a property value greater than or equal to 'Cathy' (the current value of the query cursor). When Datastore Server 106 finds an entry corresponding to Name='Mike,' Datastore Server 106 does not identify 'Cathy' as a valid search result to Query 520-*a*, but identifies 'Mike' as a candidate value and updates the current value of the query cursor to 'Mike.' Upon proceeding (560-*e*) to Index Portion 501-*c*, Datastore Server 106 searches for the first index entry with property value greater than or equal to the current value (Name='Mike') of the query cursor. Upon identifying an index entry with property value='Mike' in Index Portion 501-*c*, Datastore Server 106 identifies 'Mike' as a valid search result to Query 520-*a*, proceeds to traverse (560-*f*) Index Portion 501-*c* to identify the first index entry with property value greater than and distinct from the current value of the query cursor (e.g., Name='Mike'), identifies an index entry with property value 'Ted' and updates the current value of the query cursor accordingly. Results 530-*a* are generated to include the identified distinct values (Adam' and 'Mike') as valid search results of Property='Name' satisfying Query 520-*a*.

The execution of Query 520-*a* using sorted index portions, as shown in FIG. 5C provides the advantage of improved efficiency of searching by way of skipping multiple index entries that are not valid matches. In particular, when a current value of a query cursor has advanced to a particular value, this is an indication that all values prior to the current value in the sort order have been determined to match or not match the search query, and thus an index scanner can skip directly to the first index entry that has a value greater than or equal to the query cursor value. In some circumstances this has the effect of skipping large numbers of index entries in the index portion. For example, at step 560-*d*, Datastore Server 106 skips index entries corresponding to Name='Brett' in Index Portion 511-*c* and at step 560-*e*, Datastore Server 106 skips index entries corresponding to Name='Karen' in Index Portion 501-*c*. Moreover, in some implementations, the index portion is distributed over a plurality of different physical storage devices (e.g., hard drives or solid state memory) and skipping large numbers of index entries includes skipping (i.e., not accessing) one or more of the physical storage devices, thereby saving the time, power and network resources that would be otherwise expended in accessing the skipped physical storage devices. In addition to the efficiency of skipping index entries that are known not to match the search query, the process for searching indexes described above also produces results that are sorted in the sort order (e.g., the names in Results 530-*a* are sorted alphabetically).

It should be noted that Index Portion 501-*c* and Index Portion 511-*c* do not need to have (and in the example in FIG. 5C, do not have) identical sets of properties for the above-described execution of the 'select distinct' query. For example, while Index Portion 501-*c* and Index Portion 511-*c* both have Property='Name,' Index Portion 501-*c* has Property='Age' and Index Portion 511-*c* has Property='Eye Color,' which are not identical between the two index portions. In this example after retrieving an index entry from Index Portion 501-*c* or Index Portion 511-*c*, Datastore Server 106 truncates the index entry by removing the values of properties that are not part of the "select distinct" criterion, in this case by removing values prior to and after the name property to generate candidate values so that the candidate values obtained from Index Portion 501-*c* can be compared with the candidate values obtained from Index Portion 511-*c*. Stated another way, for use in continued scanning of the selected index portions, the Datastore Server 106 (or its Filter Scanner) retains values of properties that are part of the "select distinct" criterion.

For simplicity, in the example shown in FIG. 5C, the query specifies a "select distinct" criterion based solely on one property (in this example, Select Distinct 'Name'). In some implementations, in the event that the 'select distinct' criterion includes two or more properties (e.g., Select Distinct 'Name' and 'Hobby'), instead of identifying single candidate values (corresponding to a single value of a single property in the 'select distinct' query) from each index portion, Datastore Server 106 identifies candidate value combinations (corresponding to combinations of values of the two or more properties in the 'select distinct' query).

Consider FIG. 5D illustrating the execution of an example 'select distinct' query—Query 520-*b* (State='California' OR Occupation='Lawyer'; Select Distinct 'Name'). For the sake of simplicity and consistency, the same index portions (Index Portion 501-*c* and Index Portion 511-*c*) used to demonstrate the execution of Query 520-*a* (FIG. 5C) are used to illustrate the execution of Query 520-*b* (FIG. 5D). A key distinction between the queries demonstrated in FIG. 5C and FIG. 5D is in the logical relationship between the filter criteria (AND vs. OR) specified by the respective queries. In the examples shown in FIGS. 5C and 5D, a difference in the logical relationship specified by the two different queries results in different query processing steps as well as a different set of search results (as demonstrated below).

Analogous to Query 520-a (of FIG. 5C), the query (Query 520-b) shown in FIG. 5D specifies that distinct values of a property (e.g., distinct values of Property='Name') that are present in one or more index portions used to process the query be retrieved from the respective index portions. As explained above with reference to Query 520-a (FIG. 5C), based on the received query (in this example, Query 520-b), Datastore Server 106 (e.g., using Index Portion Identifier 424 of Query Engine 126, FIG. 4) identifies indexes sorted by the properties specified in the query (e.g., Property 504, 506 in Index-A 142-A and Property 514, 516 in Index-B 142-B, FIGS. 5A-5B) and from the identified indexes, Datastore Server 106 identifies index portions (e.g., Index Portion 501-c and Index Portion 511-c) to be used for the execution of the query. Datastore Server 106 (e.g., using Filter Scanner 426 of Query Engine 126, FIG. 4) then identifies distinct values of the specified property (e.g., distinct values of Property='Name') that are present in the one or more index portions (e.g., Index Portion 501-c and Index Portion 511-c) used to process the query, as valid results.

In FIG. 5D, the logical OR operator specifies that distinct values of a property (in this example, Property='Name') are to be retrieved as valid search results when the distinct values occur in either (or both) of Index Portion 501-c or in Index Portion 511-c. To this end, Datastore Server 106 concurrently identifies property values or value combinations (referred to also as candidate values or candidate value combinations) from each index portion of the two or more index portions over which the query is to be executed and based on a comparison between the identified candidate values or candidate value combinations identifies a distinct value in accordance with the sort order (e.g., a lowest or minimum candidate value combination of the selected candidate value combinations). In some embodiments, Datastore Server 106 maintains a current value of a query cursor corresponding to, for example, the lowest candidate value combination retrieved as a valid search result in the previous iteration (or the lowest candidate value combination+null character) and uses the current value of the query cursor as a starting point for identifying subsequent candidate value combinations.

As shown in FIG. 5D, Datastore Server 106 identifies as first candidate value (value of Property 506) 'Adam' from Index Portion 501-c and candidate value 'Adam' (value of Property 516) from Index Portion 511-c. Upon comparing (561-a) the two identified candidate values (e.g., to identify the minimum of the two), Datastore Server 106 selects 'Adam' as a valid search result (in this example, both candidate values being equal), and updates the current value of the query cursor to Name='Adam.'

Datastore Server 106 then proceeds to identify the first index entry with property value greater than (or sequentially adjacent to) the current value of the query cursor (e.g., 'Adam')—for example, subsequent or sequentially adjacent (in the sort order) and distinct candidate values of the 'Name' property—in both Index Portion 501-c (Property 506) and in Index Portion 511-c (Property 516). Accordingly, Datastore Server 106 identifies 'Cathy' from Index Portion 501-c and 'Bernie' from Index Portion 511-c as distinct candidate values. Upon comparing (561-b) 'Cathy' and 'Bernie' (the two identified distinct candidate values form the two index portions), Datastore Server 106 selects 'Bernie' as the minimum of the two candidate values, identifies 'Bernie' as a valid search result, and updates the current value of the query cursor to 'Bernie.'

Datastore Server 106 then proceeds to identify the first index entry with property value greater than (e.g., sequentially adjacent to, in the increasing direction) the current value of the query cursor (e.g., 'Bernie') in both Index Portion 501-c (Property 506) and in Index Portion 511-c (Property 516). Datastore Server 106 then traverses Index Portion 511-c (from which the previous candidate value, e.g., 'Bernie' was selected as a valid search result) and identifies 'Brett' as the next candidate value in Index Portion 511-c greater than the current value of the query cursor. The execution of Query 520-b using sorted index portions, therefore provides the advantage of improved efficiency of searching by way of skipping the steps of traversing each of the index portions at every iteration. For example, at this step, Datastore Server 106 traverses Index Portion 511-c (from which the previous candidate value, e.g., 'Bernie' was selected as a valid search result), but does not traverse Index Portion 501-c. Datastore Server 106 identifies 'Cathy' from Index Portion 501-c and 'Brett' from Index Portion 511-c as candidate values. Datastore Server 106 compares (561-c) the candidate value from Index Portion 501-c (Cathy') with the candidate value from Index Portion 511-c (Brett') to identify the minimum of the two (e.g., 'Brett') as a distinct candidate value and a valid search result. Datastore Server 106 then updates the current value of the query cursor to 'Brett.'

Continuing the traversing of Index Portion 511-c (from which the previous candidate value, e.g., 'Bernie' was selected as a valid search result), as described above, Datastore Server 106 then identifies 'Mike' as the candidate value in Index Portion 511-c greater than the current value of the query cursor (e.g., 'Brett'). Datastore Server 106 then proceeds to identify the first index entry with property value greater than the current value of the query cursor (e.g., 'Brett') in both index portions. Datastore Server 106 identifies 'Cathy' from Index Portion 501-c and 'Mike' from Index Portion 511-c as candidate values. Datastore Server 106 compares (561-d) the candidate value from Index Portion 501-c ('Cathy') with the candidate value from Index Portion 511-c ('Mike') to identify the minimum of the two (e.g., 'Cathy') as a distinct candidate value and a valid search result. Datastore Server 106 then updates the current value of the query cursor to 'Cathy.'

Now, Datastore Server 106 traverses Index Portion 501-c (from which the previous candidate value, e.g., 'Cathy' was selected as a valid search result) and identifies 'Karen' as the next distinct value in Index Portion 501-c greater than the current value of the query cursor (e.g., 'Cathy'). As described above, Datastore Server 106 proceeds to identify the first index entry with property value greater than the current value of the query cursor (e.g., 'Cathy') in both index portions. Datastore Server 106 identifies 'Karen' from Index Portion 501-c. Next, Datastore Server 106 identifies 'Mike' from Index Portion 511-c as candidate values. Datastore Server 106 compares (561-e) the candidate value from Index Portion 501-c ('Karen') with the candidate value from Index Portion 511-c ('Mike') to identify the minimum of the two (e.g., 'Karen') as a valid search result. Datastore Server 106 then updates the current value of the query cursor to 'Karen.'

Continuing to execute the search in a manner similar to that described above, Datastore Server 106 generates Results 530-b (including distinct values of Property='Name': 'Adam,' 'Bernie,' 'Brett,' 'Cathy,' 'Karen,' 'Mike,' and 'Peter'). In addition to providing the enhanced efficiency associated with avoiding traversal of a respective index when the current value of the query cursor is less than a known minimum value of the select distinct property in the respective index, the above-described process of searching indexes also produces results that are sorted in the sort order (e.g., the names in Results 530-b are sorted alphabetically) of the index portions used to process the query.

Responding to a 'Select Distinct' Query

Figure 6:
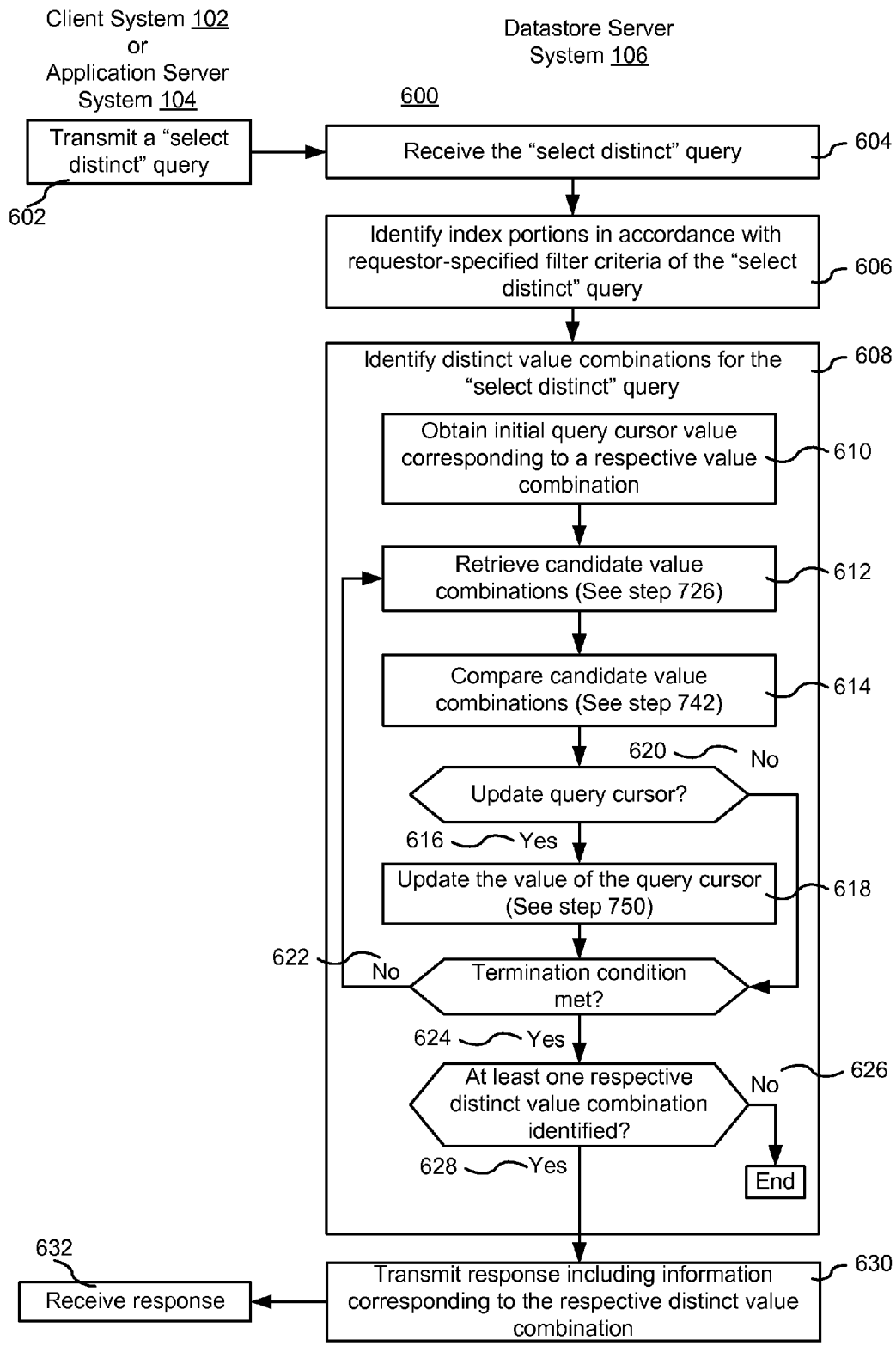
FIG. 6 includes a flow chart illustrating a method for receiving and processing a select distinct query at a datastore server system and returning search results, in accordance with some embodiments.
Figure 7A:
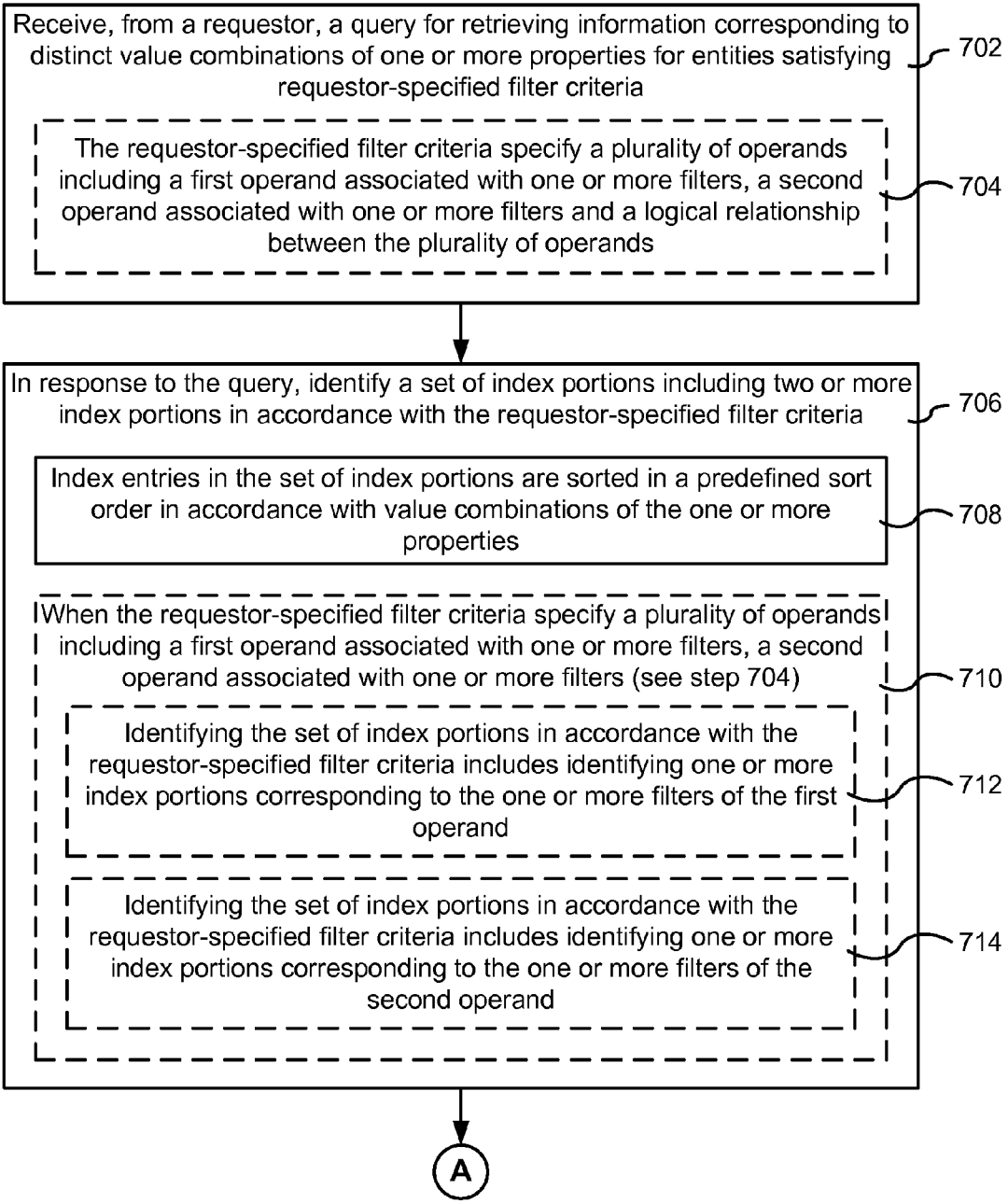
FIGS. 7A-7H include a flow chart illustrating a method for responding to a select distinct query at a datastore server system, in accordance with some embodiments.
Figure 7B:
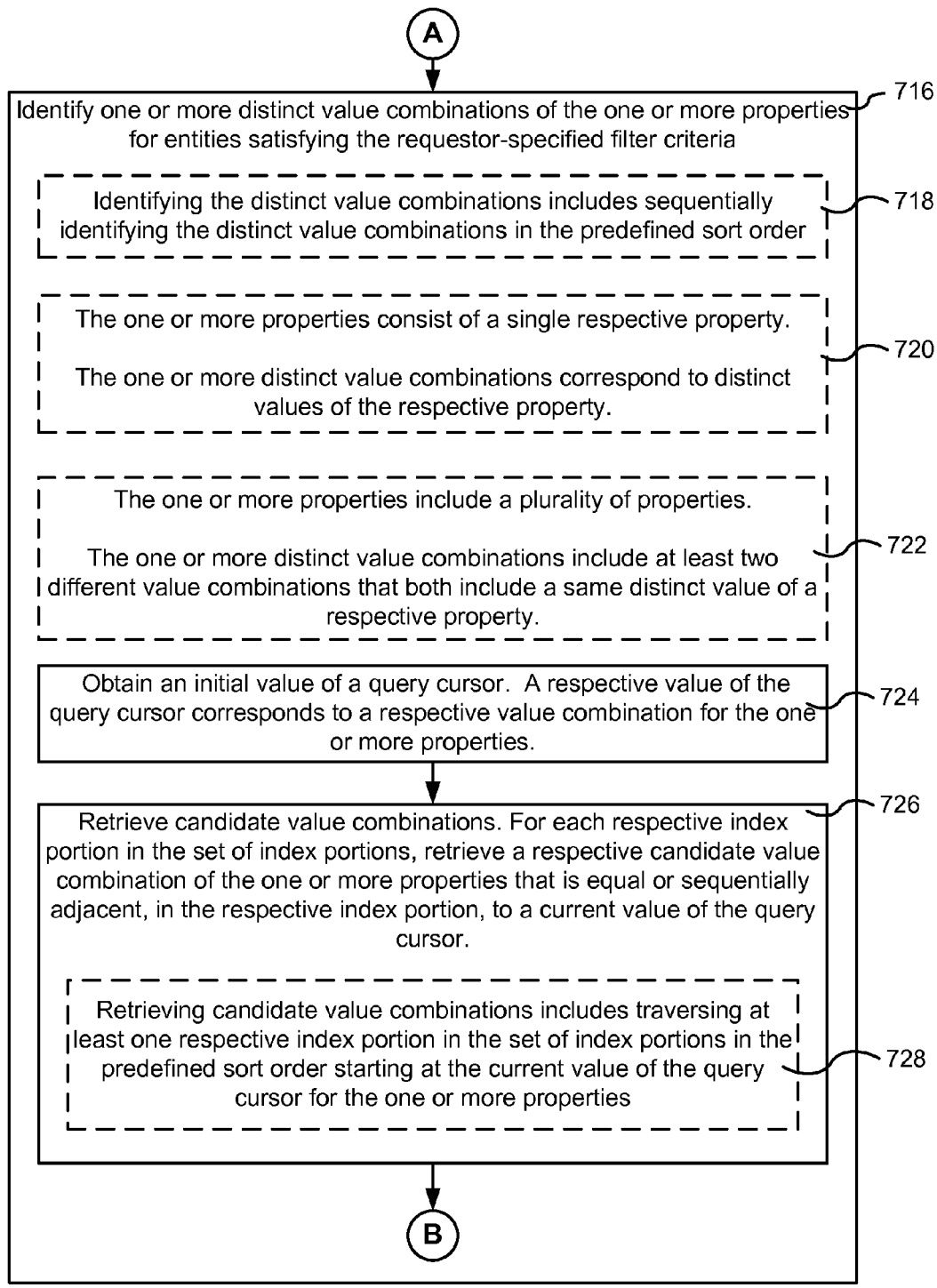
Figure 7C:
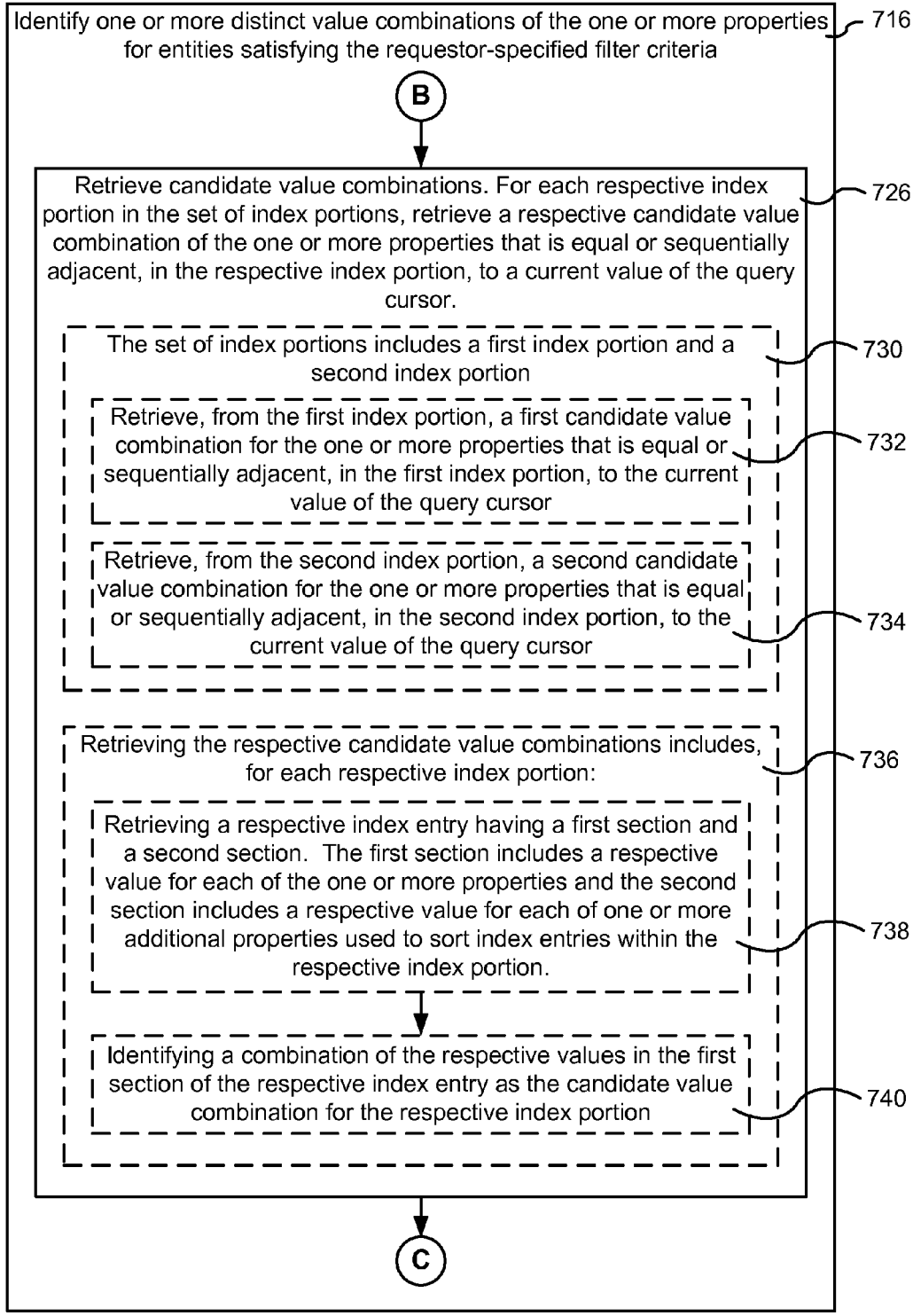
Figure 7D:
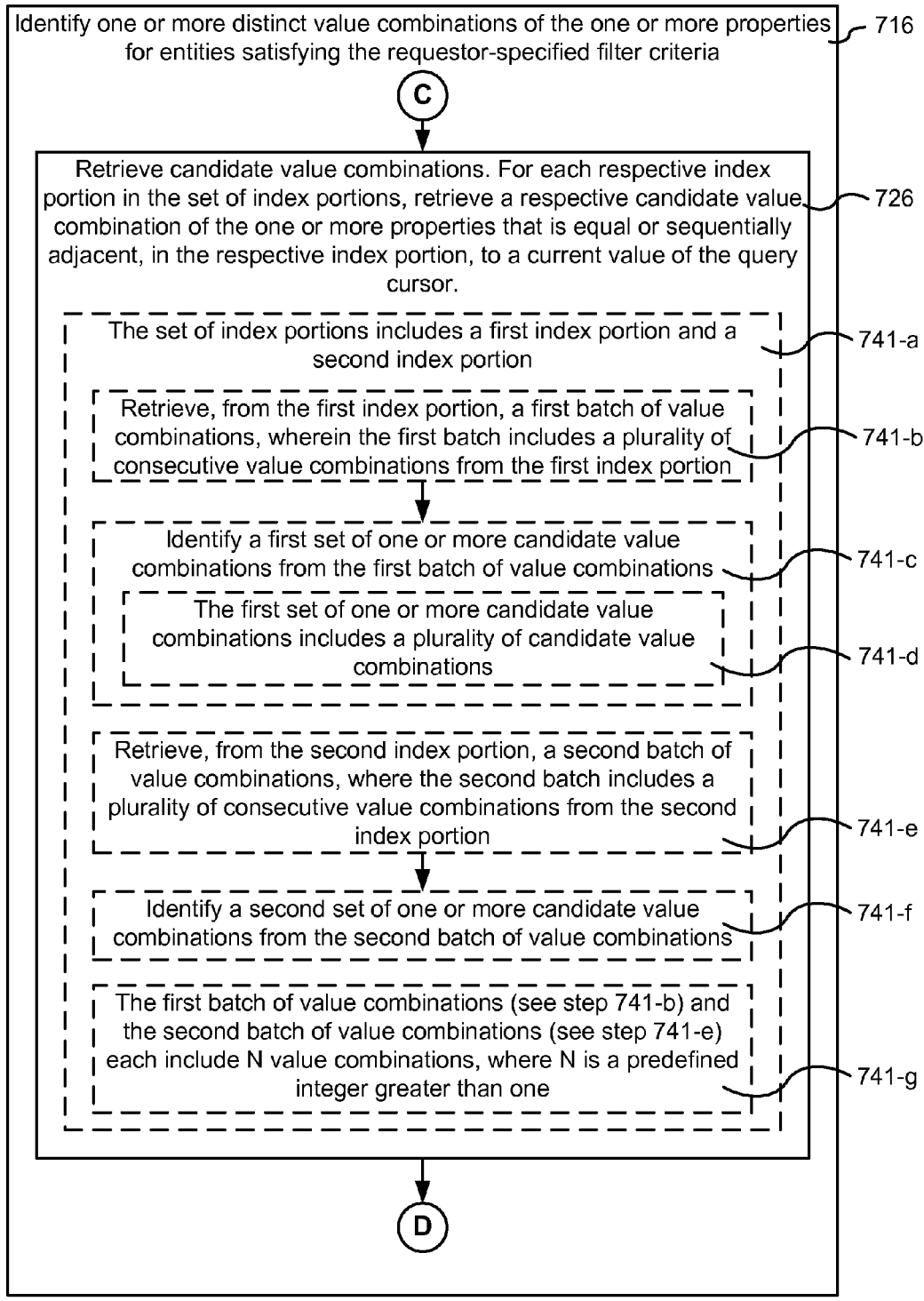
Figure 7E:
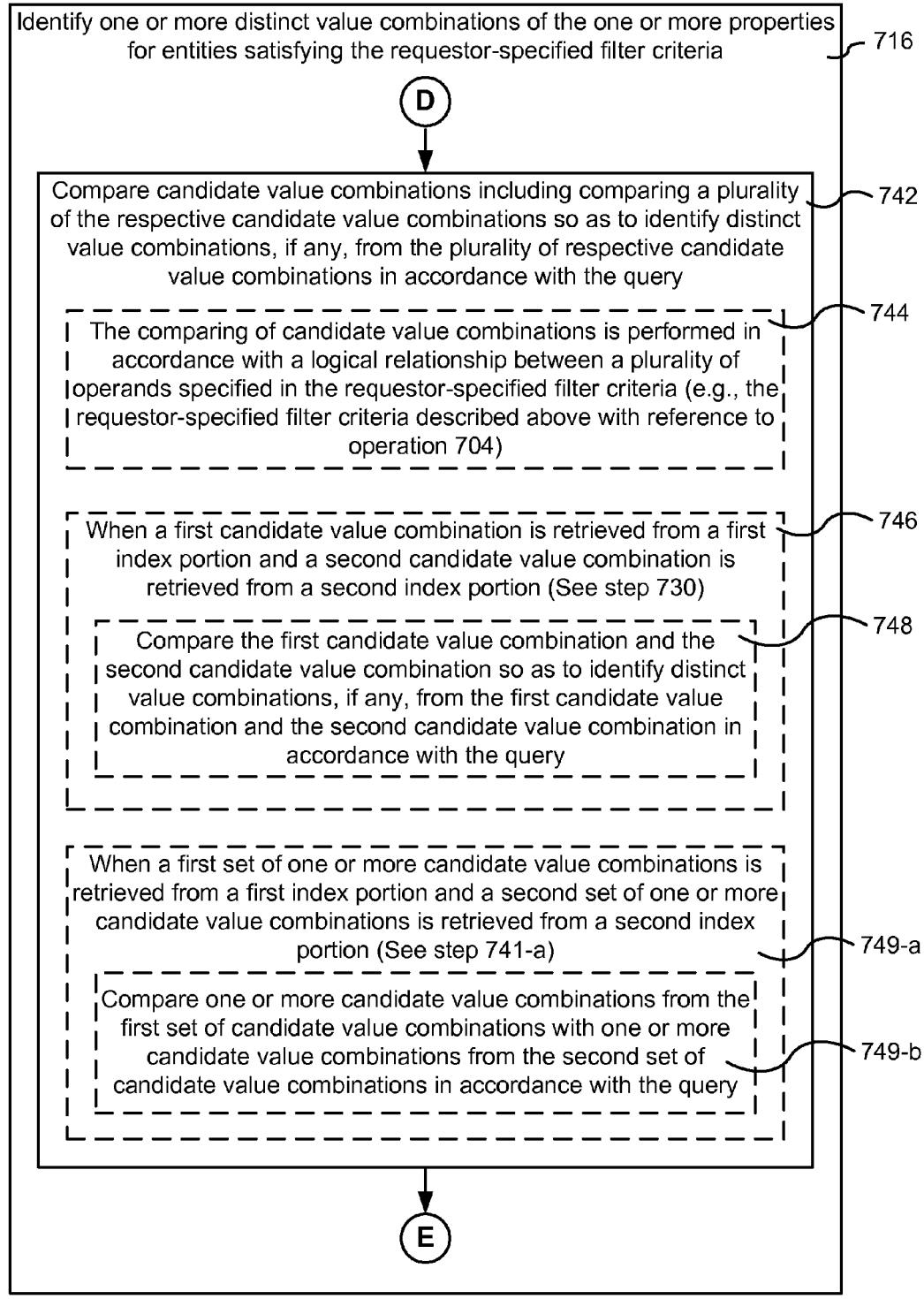
Figure 7F:
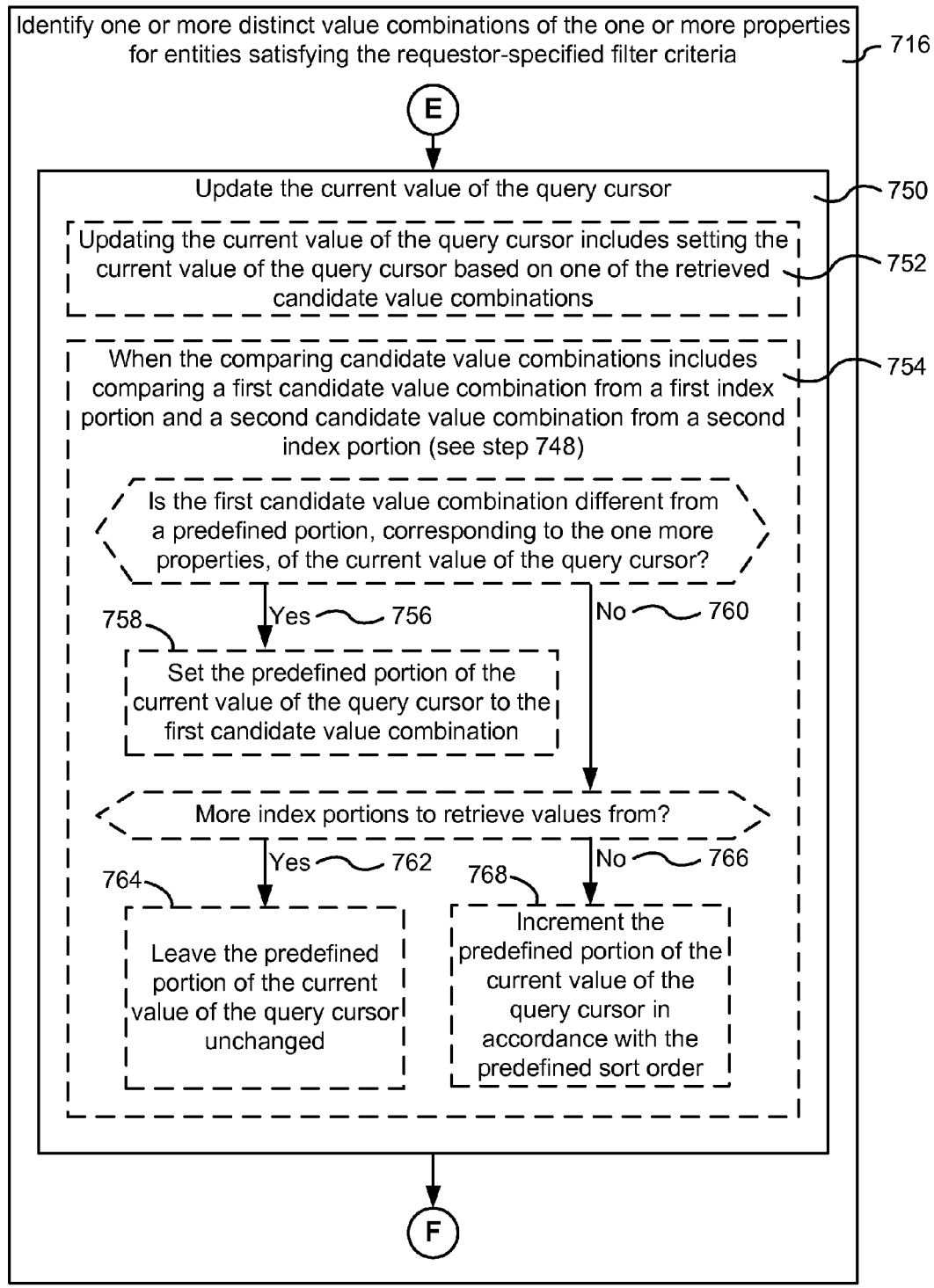
Figure 7G:
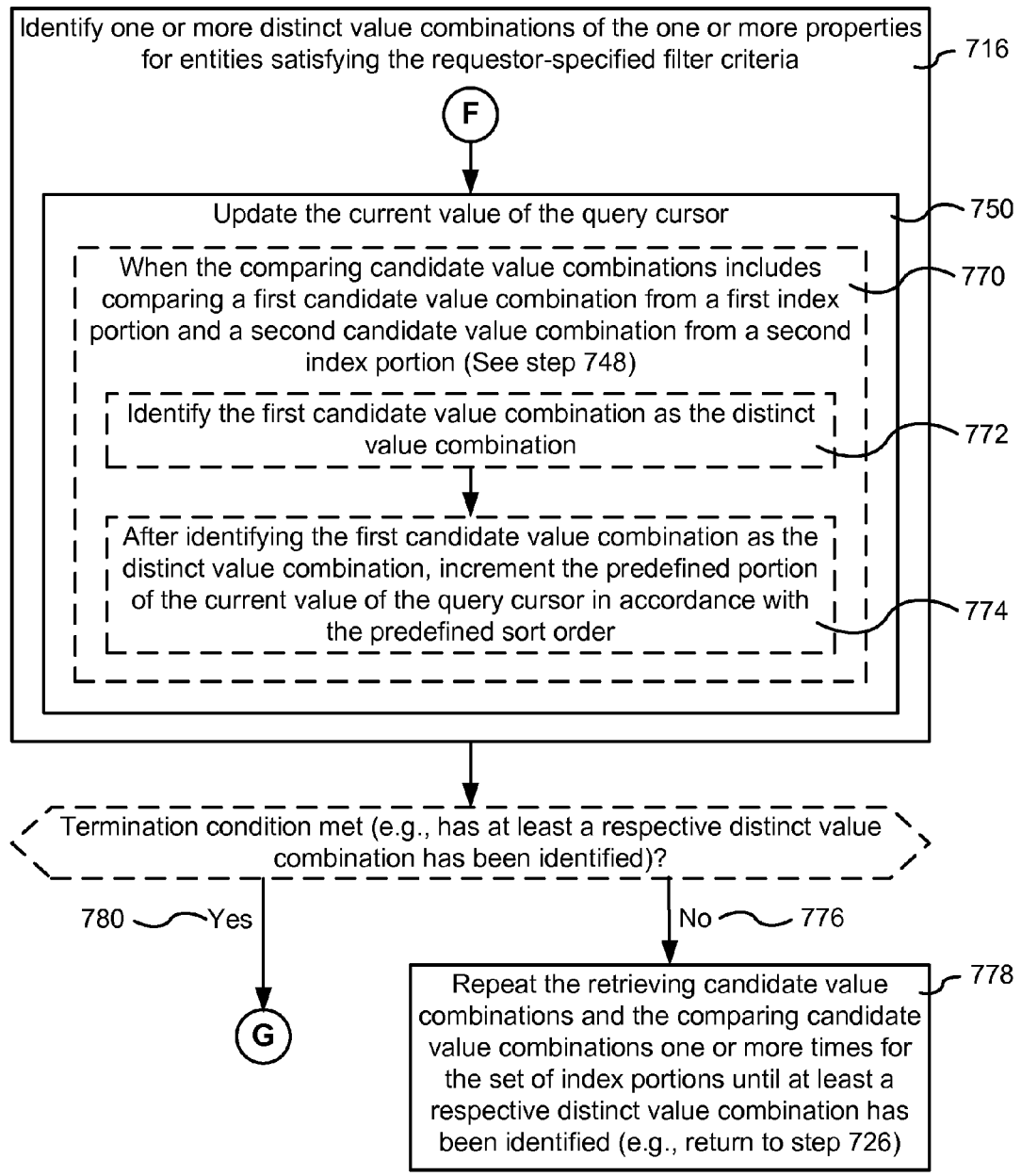
Figure 7H:
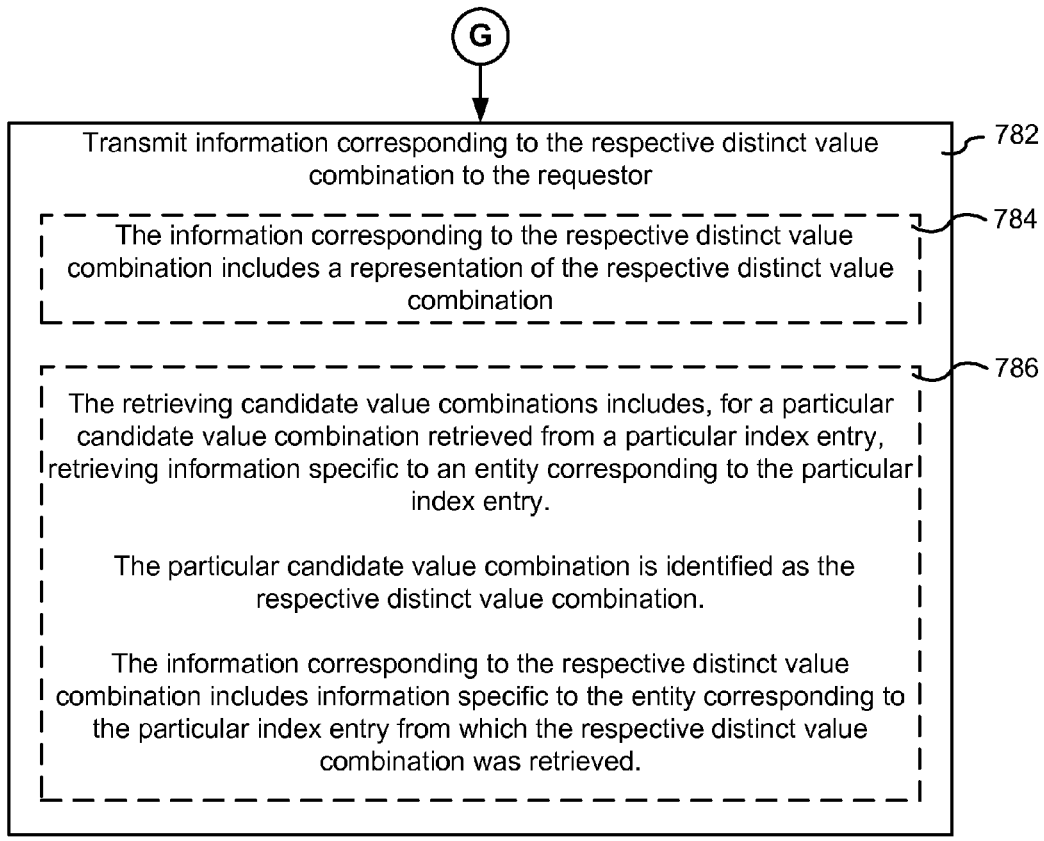

FIG. 6 includes a flowchart representing a method 600 for receiving and processing requests from Client 102 or App Server 104 at Datastore Server 106 and returning responses to Client 102 or App Server 104 based on an empirically-determined schema, according to certain embodiments. Method 600 is, optionally, governed by instructions that are stored in a non-transitory computer readable storage medium and that are executed by one or more processors of one or more computer systems (e.g., Client 102, App Server 104 or Datastore Server 106). Each of the operations shown in FIG. 6 typically corresponds to instructions stored in a computer memory or non-transitory computer readable storage medium (e.g., memory 206 of Client 102 in FIG. 2, memory 306 of App Server 104 in FIG. 3 or memory 406 of Datastore Server 106 in FIG. 4). The non-transitory computer readable storage medium optionally includes a magnetic or optical disk storage device, solid state storage devices such as Flash memory, or other non-volatile memory device or devices. The computer readable instructions stored on the computer readable storage medium optionally includes one or more of: source code, assembly language code, object code, or other instruction format that is executed or interpreted by one or more processors. In various embodiments, some operations in method 600 are optionally combined and/or the order of some operations are optionally changed from the order shown in FIG. 6.

A requestor (Client 102 or App Server 104) transmits (602) a 'select distinct' query to Datastore Server 106. For example, as shown in FIGS. 5C-5D, a requestor transmits 'select distinct' Query 520-a or Query 520-b to Datastore Server 106. Datastore Server 106 receives (604) the 'select distinct' query.

After receiving the 'select distinct' query from the requestor, Datastore Server 106 identifies (606) index portions in accordance with requestor-specified filter criteria of the 'select distinct' query. For example, as shown in FIGS. 5A-5D, Index Portion 501-c and Index Portion 511-c are identified in accordance with requestor-specified filter criteria (State='California' AND/OR Occupation='Lawyer') of the 'select distinct' query (Query 520-a or Query 520-b). In these examples, State='California' and Occupation='Lawyer' are filters specified by Query 520-a and Query 520-b. Furthermore, the logical relationship between the filters in Query 520-a is AND; the logical relationship between the filters in Query 520-b is OR.

Datastore Server 106 identifies (608) distinct value combinations for the 'select distinct' query (including one or more of steps 610-628) in the identified index portions. For example, as shown in FIG. 5C, when the logical relationship between the filters is AND, Datastore Server 106 identifies 'Adam' and 'Mike' as distinct value combinations for the 'select distinct' query (e.g., Query 520-a). In contrast, as shown in FIG. 5D, when the logical relationship between the filters is OR, Datastore Server 106 identifies 'Adam,' 'Bernie,' 'Brett,' 'Cathy,' 'Karen,' 'Mike,' and 'Peter' as distinct value combinations for the 'select distinct' query (e.g., Query 520-b).

Datastore Server 106 obtains (610) initial query cursor value corresponding to a respective value combination. For example, as explained with reference to FIG. 5C, Datastore Server 106 obtains 'Adam' as an initial query cursor value corresponding to a first value combination obtained from Index Portion 501-c. After obtaining the initial query cursor value, Datastore Server 106 retrieves (612) candidate value combinations (see Method 700, step 726) based on the current query cursor value. Datastore Server 106 then compares (614) candidate value combinations (see Method 700, step 742). As explained with reference to FIG. 5D, Datastore Server 106 retrieves candidate value 'Cathy' from Index Portion 501-c and candidate value 'Bernie' from Index Portion 511-c and compares (561-b) the two retrieved candidate values to determine the lower of the two values.

Datastore Server 106 makes a determination as to whether to update the query cursor. Upon determining that the query cursor needs to be updated (616), Datastore Server 106 updates (618) the value of the query cursor (see Method 700, step 750). Upon determining that the query cursor does not (620) need to be updated, Datastore Server 106 does not update the value of the query cursor. For example, when the logical relationship specified by the query (e.g., Query 520-a) is Boolean AND, and Datastore Server 106 identifies a candidate value combination in a first index portion, it makes a determination not to update the query cursor until it finds a match in the remaining index portions. However, as explained with reference to FIG. 5D, when the logical relationship specified by the query (e.g., Query 520-a) is Boolean OR, and Datastore Server 106 identifies a lowest candidate value combination in an index portion, it makes a determination to update the query cursor in accordance with the lowest candidate value combination identified (e.g., by incrementing the query cursor by a null character or by advancing the query cursor to a next value in the sort order).

Datastore Server 106 makes a determination as to whether the termination condition has been met. For example, if the requestor specifies an upper limit on the number of distinct candidate values to be retrieved, then Datastore Server 106 would make a determination as to whether the number of retrieved distinct candidate values has been reached. Also, as an example, during the execution of Query 520-a (FIG. 5C) where the logical relationship between the operands is AND, when the end of one or more index portions is reached, Datastore Server 106 would make a determination that the termination condition has been met, as there will not be any additional distinct values that are matched in the index portion for which an end has been reached. Upon determining that the termination condition has not (622) been met, Datastore Server 106 repeats the retrieving (step 612), comparing (step 614) and, optionally, the updating (step 618) operations described above.

Upon determining that the termination condition has been met (624), Datastore Server 106 makes a determination as to whether at least one respective distinct value combination has been identified. In some embodiments, upon determining that at least one distinct value combination has not (626) been identified, Datastore Server 106 terminates query-processing (e.g., because no distinct value combinations have been identified and thus there are no results to report to the requestor), or returns a no-results response. Upon determining that at least one distinct value combination has (628) been identified, Datastore Server 106 transmits (630) a response including information corresponding to the respective distinct value combination to the requestor. For example, as shown in FIG. 5C, Datastore Server 106 transmits Results 530-a (including distinct value combinations 'Adam' and 'Mike') to the requestor. In some embodiments, Datastore Server 106 may transmit additional and/or alternative information corresponding to the respective distinct value combinations (e.g., an entity name, an entity last modification date, or the entire entity corresponding to a first entity identified as having the distinct value combination). After the response is transmitted by Datastore Server 106, the requestor receives (632) the response. In implementations where the requestor is App Server 104, App Server 104 forwards the response to Client 102 and/or performs additional processing using the response and forwards information corresponding to the response to Client 102.

It should be understood that the particular order in which the operations in FIG. 6 have been described are merely examples and are not intended to indicate that the described order is the only order in which the operations could be performed. One of ordinary skill in the art would recognize various ways to reorder the operations described herein. Additionally, it should be noted that details of other processes described herein with respect to method 700 (described herein with reference to FIGS. 7A-7H) are also applicable in an analogous manner to method 600 described above with respect to FIG. 6. For example, the entities, index(es), index portion(s), queries, and responses described above with reference to method 600 optionally have one or more of the characteristics of the various the entities, index(es), index portion(s), queries, and responses described herein with reference to method 700. For brevity, these details are not repeated here.

Generating a Response to a Select Distinct Query

FIGS. 7A-7H include a flowchart representing a method 700 for generating a response to an application request based on an empirically-determined schema, which in turn is generated from an index of entities, according to certain embodiments. Method 700 is, optionally, governed by instructions that are stored in a non-transitory computer readable storage medium and that are executed by one or more processors of one or more servers (e.g., Datastore Server 106, FIG. 4). Each of the operations shown in FIGS. 7A-7H typically corresponds to instructions stored in a computer memory or non-transitory computer readable storage medium (e.g., memory 406 of Datastore Server 106 in FIG. 4). The non-transitory computer readable storage medium optionally includes a magnetic or optical disk storage device, solid state storage devices such as Flash memory, or other non-volatile memory device or devices. The computer readable instructions stored on the computer readable storage medium optionally include one or more of: source code, assembly language code, object code, or other instruction format that is executed or interpreted by one or more processors. In various embodiments, some operations in method 700 are optionally combined and/or the order of some operations are optionally changed from the order shown in FIGS. 7A-7H.

Datastore Server 106 receives (702), from a requestor (e.g., Client 102 or App Server 104), a query for retrieving information corresponding to distinct value combinations of one or more properties for entities satisfying requestor-specified filter criteria. For example, as shown in FIG. 5C, Query 520-*a* specifies select distinct: 'Name' where State='California' AND Occupation='Lawyer' to find distinct names of people in California who are lawyers by occupation.

In some embodiments, the requestor-specified filter criteria specify (704) a plurality of operands including a first operand associated with one or more filters, a second operand associated with one or more filters and a logical relationship between the plurality of operands. For example, as shown in FIG. 5C, Query 520-*a* includes filter-criteria specifying a first operand associated with one or more filters (State='California'), a second operand associated with one or more filters (Occupation='Lawyer') and a logical relationship (e.g., 'AND') between the first and second operands.

In response to the query, Datastore Server 106 identifies (706) a set of index portions including two or more index portions in accordance with the requestor-specified filter criteria. In some implementations, this is accomplished using Index Portion Identifier 424 of Query Engine 126 (FIG. 4). Index entries in the set of index portions are sorted (708) in a predefined sort order in accordance with value combinations of the one or more properties. For example, as shown in FIGS. 5A-5D, Index Portion 501-*c* and Index Portion 511-*c* are identified in accordance with requestor-specified filter criteria (State='California' AND/OR Occupation='Lawyer') of the 'select distinct' query (Query 520-*a* or Query 520-*b*). Index entries in Index Portion 501-*c* and Index Portion 511-*c* are sorted in a predefined sort order in accordance with value property 'Name' (Property 506 in Index A and Property 516 in Index B).

In some embodiments, when the requestor-specified filter criteria specify (710) a plurality of operands including a first operand associated with one or more filters and a second operand associated with one or more filters (see step 704), identifying the set of index portions in accordance with the requestor-specified filter criteria includes (712) identifying one or more index portions corresponding to the one or more filters of the first operand (e.g., as shown in FIG. 5C, an index portion for State=California) and identifying the set of index portions in accordance with the requestor-specified filter criteria includes (714) identifying one or more index portions corresponding to the one or more filters of the second operand (e.g., as shown in FIG. 5C, an index portion for Occupation='Lawyer').

After identifying the one or more index portions, Datastore Server 106 identifies (716) one or more distinct value combinations of the one or more properties for entities satisfying the requestor-specified filter criteria in the one or more index portions. In some embodiments, identifying the distinct value combinations includes (718) sequentially identifying the distinct value combinations in the predefined sort order. For example, as shown in FIG. 5D, distinct value combinations identified as Results 530-*b* are identified in alphabetical order (e.g., 'Adam,' 'Bernie,' 'Brett,' 'Cathy,' 'Karen,' 'Mike,' 'Peter').

In some embodiments, the one or more properties consist of (720) a single respective property and the one or more distinct value combinations correspond to distinct values of the respective property. For example, for a single property 'A' which has possible values of 0 or 1, both (A=0) and (A=1) are distinct value combinations. As shown in FIG. 5C, Property 506 (Name') in Index Portion 501-*c* has distinct values 'Adam,' 'Cathy,' 'Karen,' 'Mike,' 'Ted.'

In some implementations, the one or more properties include (722) a plurality of properties and the one or more distinct value combinations include at least two different value combinations that both include a same distinct value of a respective property. For example, for properties 'A' and 'B' which each have possible values of 0 or 1, [A=0, B=0] and [A=0, B=1] are distinct value combinations. In other words, while some implementations provide that distinct value combinations correspond to values of a single property (e.g., for property 'Name,' ['Adam'] and ['Cathy'] are distinct value combinations), other implementations provide that distinct value combinations correspond to value combinations obtained from a concatenation of the values of more than one property (e.g., for properties 'Name' and 'Age,' [Name='Adam'; Age=21], [Name='Adam'; Age=44] and [Name='Cathy'; Age=21] are distinct value combinations).

Prior to retrieving candidate value combinations based on the one or more index portions, Datastore Server 106 obtains (724) an initial value of a query cursor. A respective value of the query cursor corresponds to a respective value combination for the one or more properties. For example, as explained with reference to FIG. 5C, Datastore Server 106 sets 'Adam' as an initial query cursor value corresponding to a first value combination obtained from Index Portion 501-*c*. In some embodiments, obtaining an initial value of a query cursor includes initializing the value of the query cursor (e.g., to a first value in the sort order such as a null character). In some embodiments, obtaining an initial value of a query cursor includes retrieving an initial value of the query cursor from a previously stored value.

After obtaining the initial query cursor value, Datastore Server 106 retrieves (726) candidate value combinations based on the current query cursor value. In some embodiments, for each respective index portion in the set of index portions, Datastore Server 106 retrieves a respective candidate value combination of the one or more properties that is equal or sequentially adjacent, in the respective index portion, to a current value of the query cursor. As explained above, in the example shown in FIG. 5C (where the logical relationship specified by Query 520-*a* is a Boolean AND), Datastore Server 106 retrieves a candidate value of the property 'Name' that is greater than (sequentially adjacent to) or equal to, in the respective index portion, a current value of the query cursor. On the other hand, in the example shown in FIG. 5D (where the logical relationship specified by Query 520-*a* is a Boolean OR), Datastore Server 106 retrieves a candidate value of the property 'Name' that is sequentially adjacent, in the respective index portion, to the current value of the query cursor. For example, after comparing (at step 561-*b*), the candidate value obtained from Index Portion 501-*c* (e.g., 'Cathy') and the candidate value obtained from Index Portion 511-*c* (e.g., Bernie'), after identifying 'Bernie' as the distinct value, and after updating the current value of the query cursor to 'Bernie,' Datastore Server 106 retrieves the next candidate value (e.g., 'Brett') from Index Portion 511-*c* (e.g., the index portion from which the last distinct value was selected) that is sequentially adjacent to (greater than) the current value (e.g., 'Bernie') of the query cursor.

In some situations, one or more of the respective candidate values are retrieved from a candidate value combination cache and are not requested from the index scanners. For example for an OR query, current minimum values of one or more of the index portions that were not selected in a prior iteration are retained and compared to newly retrieved minimum values of one or more of the index portions. In particular, in the example shown in FIG. 5D, at step 561-*b* 'Cathy' and 'Bernie' are identified as current minimum values for Index Portion 501-*c* and Index Portion 511-*c*, respectively; in a subsequent iteration, 'Bernie' is selected as a respective distinct value for the query and thus 'Cathy' is retained as a current minimum value for Index Portion 501-*c* while 'Bernie' is replaced by 'Brett' as a current minimum value for Index Portion 511-*c*.

In some implementations, retrieving candidate value combinations includes (728) traversing at least one respective index portion in the set of index portions in the predefined sort order starting at the current value of the query cursor for the one or more properties. In some circumstances, traversing a respective index portion includes traversing a portion of the respective index portion. As explained with reference to FIG. 5D above, after identifying 'Bernie' as the distinct value, Datastore Server 106 traverses Index Portion 511-*c* to retrieve the next candidate value (e.g., 'Brett') from Index Portion 511-*c*.

In some implementations, the set of index portions includes (730) a first index portion and a second index portion. For example, as shown in FIGS. 5C-5D, the set of index portions includes Index Portion 501-*c* and Index Portion 511-*c*. Datastore Server 106 retrieves (732), from the first index portion, a first candidate value combination for the one or more properties that is equal or sequentially adjacent, in the first index portion, to the current value of the query cursor. Datastore Server 106 retrieves (734), from the second index portion, a second candidate value combination for the one or more properties that is equal or sequentially adjacent, in the second index portion, to the current value of the query cursor. For example, as shown in FIG. 5C, after updating the current value of the query cursor to 'Adam,' Datastore Server 106 traverses (560-*b*) Index Portion 511-*c*, identifies and retrieves Bernie' as a candidate value from Index Portion 511-*c* and updates the current value of the query cursor to 'Bernie.' Datastore Server 106 then proceeds to Index Portion 501-*c* and identifies and retrieves 'Cathy' as a candidate value from Index Portion 501-*c*, as 'Cathy" is the value in Index Portion 501-*c* that is sequentially adjacent to the current value ('Bernie') of the query cursor.

In some implementations, retrieving the respective candidate value combinations includes (736), for each respective index portion, retrieving (738) a respective index entry having a first section and a second section, where the first section includes a respective value for each of the one or more properties and the second section includes a respective value for each of one or more additional properties used to sort index entries within the respective index portion. In some embodiments, retrieving the respective candidate value combinations includes (736), for each respective index portion, identifying (740) a combination of the respective values in the first section of the respective index entry as the candidate value combination for the respective index portion. For example, an index entry has values corresponding to properties 'Name,' 'Age,' and 'Hobby,' and the index entry includes a first section corresponding to values of properties 'Name' and 'Age' and a second section corresponding to values of property 'Hobby,' then a candidate value combination includes a combination of the respective values in the first section (e.g., a combination of values of properties 'Name' and 'Age').

In some situations, the plurality of index portions includes two or more indexes that are sorted in different sort orders (e.g., include different 'additional' properties). However, so long as all of the index portions used to perform the query have the same primary sort order (e.g., the first set of one or more properties by which index entries in the index portion are sorted) the index portions can be used for a 'select distinct' query. In other words, index portions that would be considered to be 'incompatible' for a query that required index portions to be sorted in the same sort order can be used to respond to a select distinct query by ignoring a postfix that includes values corresponding to incompatible 'additional' properties. For example, as shown in FIG. 5C, Index Portion 501-*c* and Index Portion 511-*c* have a common property 'Name' which corresponds to the property specified in the 'select distinct' query (e.g., Query 520-*a*). However, Index Portion 501-*c* and Index Portion 511-*c* do not share properties 'Age' (Property 508, Index Portion 501-*c*) and 'Eye Color' (Property 518, Index Portion 511-*c*). In some implementations, values of 'Age' and 'Eye Color,' which correspond to incompatible 'additional' properties, are treated as postfixes that can be ignored, which allows Index Portion 501-*c* and Index Portion 511-*c* to be used together to execute the 'select distinct' query.

In some implementations, the set of index portions includes (741-*a*) a first index portion and a second index portion. For example, as shown in FIGS. 5C-5D, the set of index portions includes Index Portion 501-*c* and Index Portion 511-*c*. Datastore Server 106 retrieves (741-*b*) from the first index portion, a first batch of value combinations, where the first batch includes a plurality of consecutive value combinations from the first index portion. In the examples described below with reference to operations 741-*a* through 741-*f*, 749-*a* and 749-*b*, the index portions in FIGS. 5C and 5D are further assumed to show all of the index entries (e.g., the ellipses in FIGS. 5C and 5D between the index entries do not correspond to any "not shown" index entries). In this example, as shown in FIG. 5C, Index Portion 501-*c* includes consecutive index entries with values of Property Name 506 corresponding to 'Adam,' 'Adam,' 'Adam,' 'Adam,' 'Adam,' 'Cathy,' 'Cathy,' 'Cathy,' 'Karen,' and 'Karen,' and if a batch size is defined (e.g., predetermined) as ten (e.g., each batch includes ten value combinations, see step 741-*g*), then Datastore Server 106 retrieves from Index Portion 501-*c*, a first batch of value combinations including 'Adam,' 'Adam,' 'Adam,' 'Adam,' 'Adam,' 'Cathy,' 'Cathy,' 'Cathy,' 'Karen,' and 'Karen,' Datastore Server 106 identifies (741-*c*) a first set of one or more candidate value combinations from the first batch of value combinations. In some embodiments, the first set of one or more candidate value combinations includes (741-*d*) a plurality of candidate value combinations. For example, in the batch of value combinations described above with reference to step 741-*b*, (e.g., the first batch of value combinations including 'Adam,' 'Adam,' 'Adam,' 'Adam,' 'Adam,' 'Cathy,' 'Cathy,' 'Cathy' 'Karen,' and 'Karen,'), Datastore Server 106 identifies (741-*c*) a first set of one or more candidate value combinations, e.g., 'Adam,' 'Cathy' and 'Karen.'

Datastore Server 106 retrieves (741-*e*), from the second index portion, a second batch of value combinations, where the second batch includes a plurality of consecutive value combinations from the second index portion. For example, as described above with reference to step 741-*b*, if Index Portion 511-*c* includes consecutive index entries with values of Property Name 506 corresponding to 'Adam,' 'Adam,' 'Adam,' 'Adam,' 'Adam,' 'Bernie,' 'Bernie,' 'Bernie,' 'Brett,' and 'Brett,' and if the batch size is defined (e.g., predetermined) as ten (e.g., each batch includes ten value combinations, see again step 741-*g*), then Datastore Server 106 retrieves from Index Portion 511-*c*, a second batch of value combinations including 'Adam,' 'Adam,' 'Adam,' 'Adam,' 'Adam,' 'Bernie,' 'Bernie,' 'Bernie,' 'Brett,' and 'Brett' Datastore Server 106 identifies (741-*f*) a second set of one or more candidate value combinations from the second batch of value combinations. For example, in the batch of value combinations described above with reference to step 741-*e*, (e.g., the second batch of value combinations including 'Adam,' 'Adam,' 'Adam,' 'Adam,' 'Adam,' 'Bernie,' 'Bernie,' 'Brett' and 'Brett'), Datastore Server 106 identifies (741-*f*) a first set of one or more candidate value combinations, e.g., 'Adam,' 'Bernie,' and 'Brett.'

In some embodiments, the first batch of value combinations (see step 741-*b*) and the second batch of value combinations (see step 741-*e*) each include (741-*g*) N value combinations, where N is a predefined integer greater than one (e.g., 2, 3, 4, 5, 10, 15, 20, 100). In the examples described above with reference to steps 741-*b* and 741-*e*, the first batch of value combinations and the second batch of value combinations each include N=10 value combinations. Retrieving value combinations in small batch sizes provides enhanced data retrieval efficiency in scenarios where a smaller number (e.g., in relation to the batch size) of consecutive index entries have the same value combinations. In particular, when many different value combinations occur close together in a respective index, a batch retrieval operation will retrieve multiple different value combinations and thus the respective index will not have to be queried each time that a new value combination is needed for the respective index, thereby reducing the impact of network latency corresponding to data transit times between the requesting process and the respective index and reducing the processing load on the respective index. On the other hand, in scenarios where a large number (e.g., in relation to the batch size) of consecutive index entries have the same value combinations, efficiency is gained by not retrieving all of the index entries that have the same value combination. Accordingly, depending on the quantity of indexed data and other features of the index portions, a batch size can be selected that preserves the efficiency of skipping consecutive index entries in regions of the index portions that are homogenous (e.g., regions of sequential index entries larger than the batch size that have same value combination) while gaining the efficiency of retrieving multiple value combinations in regions of the index portions that are heterogeneous (e.g., regions of sequential index entries smaller than the batch size that include index entries with multiple different value combinations).

After retrieving respective candidate value combinations, Datastore Server 106 compares (742) candidate value combinations, including comparing a plurality of the respective candidate value combinations so as to identify distinct value combinations, if any, from the plurality of respective candidate value combinations in accordance with the query. For example, as shown in FIG. 5D, Datastore Server 106 compares (561-*a*) candidate values 'Adam' and 'Adam' to identify 'Adam' as a distinct candidate value; Datastore Server 106 then compares (561-*b*) candidate values 'Cathy' and 'Bernie' to identify 'Bernie' as a distinct candidate value; Datastore Server 106 next compares (561-*c*) candidate values 'Cathy' and 'Brett' to identify 'Brett' as a distinct candidate value, and so on.

In some circumstances, the comparison between the plurality of identified value combinations results in selecting none of the identified value combinations as distinct value combinations for the respective property. For example as shown in FIG. 5C, if the logical relationship specified by the query is Boolean AND, and if candidate values retrieved from the two index portions are not equal (e.g., candidate value 'Bernie' retrieved from Index Portion 511-*c* and candidate value 'Cathy' retrieved from Index Portion 501-*c*), then neither of the candidate values is selected as a distinct candidate value.

In some embodiments, the comparing of candidate value combinations is performed (744) in accordance with a logical relationship between a plurality of operands specified in the requestor-specified filter criteria (e.g., the requestor-specified filter criteria described above with reference to operation 704). For example, if the logical relationship between two filters corresponding to two index portions is AND, then the same value combination must be found in both of the indexes to be selected as a distinct value combination. For example, as shown in FIG. 5C where the query (e.g., Query 520-*a*) specifies a Boolean AND logical relationship, 'Adam' is retrieved as a distinct value combination since 'Adam' a value combination found in both index portions used for the execution of the query. However, in the same example, 'Bernie' and 'Cathy' are not identified as distinct value combinations since they are present in one but not both index portions used for query-execution. Similarly, in some embodiments, if the logical relationship between two filters corresponding to two index portions is OR, then the value combination must be found in at least one of the index portions to be selected as a distinct value combination, and if the value combination is found in both of the index portions, it is only selected as a distinct value combination once. In the example shown in FIG. 5D, as contrasted with the example shown in FIG. 5C, the difference in the logical relationship (e.g., OR instead of AND) causes Datastore Server 106 to identify 'Bernie' and 'Cathy' as distinct value combinations since they are present in at least one index portion used for query-execution.

In some implementations, when a first candidate value combination is retrieved (746) from a first index portion and a second candidate value combination is retrieved from a second index portion (see step 730), Datastore Server 106 compares (748) the first candidate value combination and the second candidate value combination so as to identify distinct value combinations, if any, from the first candidate value combination and the second candidate value combination in accordance with the query. As explained above with reference to FIG. 5D, Datastore Server 106 retrieves candidate values 'Cathy' and 'Bernie' from Index Portion 501-c and Index Portion 511-c, respectively, and compares (561-b) the retrieved candidate values 'Cathy' and 'Bernie' to identify 'Bernie' as a distinct candidate value. Similarly, as explained above with reference to FIG. 5C, Datastore Server 106 retrieves candidate values 'Adam' and 'Adam' from Index Portion 501-c and Index Portion 511-c, respectively, and compares the retrieved candidate values 'Adam' and 'Adam' to identify 'Adam' as a distinct candidate value.

In some implementations, when (749-a) a first set of one or more candidate value combinations is retrieved from a first index portion and a second set of one or more candidate value combinations is retrieved from a second index portion (see step 741-a), Datastore Server 106 compares (749-b) one or more candidate value combinations from the first set of candidate value combinations with one or more candidate value combinations from the second set of candidate value combinations in accordance with the query. For example, when the first set of one or more candidate value combinations ('Adam' 'Cathy' and 'Karen') described above with reference to step 741-c, and the second set of one or more candidate value combinations ('Adam,' 'Bernie,' and 'Brett') described above with reference to step 741-f are retrieved, Datastore Server 106 compares one or more of 'Adam,' 'Cathy' and 'Karen' with one or more of 'Adam,' 'Bernie,' and 'Brett' in accordance with the query.

For example, if the query is State='California' AND Occupation='Lawyer'; Select Distinct 'Name', the distinct value combination identified by comparing the first and second sets of candidate combinations would be 'Adam.' In this example, after 'Adam' is identified as a distinct value, it is discarded from both batches of candidate value combinations and the remaining candidate values are compared. As a result of this comparison, 'Bernie' and 'Brett' are discarded as they do not match any candidate value combinations from Index Portion 501-c, and after running out of candidate value combinations from Index Portion 511-c, the process optionally iterates, as described below (e.g., Datastore Server 106 retrieves a new batch of candidate value combinations from Index Portion 511-c starting at the first value combination greater than or equal to 'Cathy,' as 'Cathy' is the alphabetically lowest value combination in the batch from Index Portion 501-c). In this example, Datastore Server 106 avoids making at least one request to Index Portion 501-c, because the batch of candidate value combinations included three candidate values (e.g., 'Adam,' 'Cathy' and 'Karen'), so that Datastore Server 106 knows that 'Cathy' is the next value combination in Index Portion 501-c that is greater than 'Adam' without requesting additional information from Index Portion 501-c.

After comparing candidate value combinations, Datastore Server 106 updates (750) the current value of the query cursor. In some embodiments, updating (752) the current value of the query cursor includes setting the current value of the query cursor based on one of the retrieved candidate value combinations. For example, when there is not a match, then Datastore Server 106 sets the current value of the query cursor to equal one of the retrieved candidate value combinations (e.g., an AND iteration failed to find a match for a candidate value in all of the index portions and is starting over with a next candidate value). In the example shown in FIG. 5C, Datastore Server 106 traverses (560-b) Index Portion 511-c and identifies 'Bernie' as a candidate value, updates the current value of the query cursor to 'Bernie' and proceeds to Index Portion 501-c to identify the next distinct value greater than or equal to the current value of the query cursor (e.g., 'Bernie'). When Datastore Server 106 fails to find 'Bernie' as a candidate value in Index Portion 501-c, it sets the current value of the query cursor to 'Cathy' (the identified candidate value in Index Portion 501-c). As another example, when there is a match, then Datastore Server 106 sets the current value of the query cursor to be nominally greater than the retrieved candidate value combination (e.g., for a successful AND/OR operation, Datastore Server 106 looks for a next value combination by searching using the identified value combination plus the null character).

In some embodiments, when the comparing of candidate value combinations includes (754) comparing a first candidate value combination from a first index portion and a second candidate value combination from a second index portion (see step 748), Datastore Server 106 makes a determination as to whether the first candidate value combination is different from a predefined portion, corresponding to the one more properties, of the current value of the query cursor. In some implementations, Datastore Server 106 makes a determination as to whether the first candidate value combination is sequentially adjacent to rather than equal to a predefined portion, corresponding to the one more properties, of the current value of the query cursor.

In some implementations, the current value of the query cursor has a plurality of portions, including a first portion corresponding to identified value combinations (e.g., candidate value combinations that correspond to the one or more properties for which the select distinct query was specified). Optionally, the query cursor includes a second portion indicating inclusivity of the cursor (e.g., whether the cursor is updated when a matching value combination is retrieved from one of the index portions). For example, when the query cursor includes a portion indicating that the query cursor is inclusive (e.g., for a select distinct query with a logical relationship of AND between filters where at least two index portions have not yet been searched) the first portion of the current value of the query cursor is not updated if a match is found in a next index portion. In contrast, when the query cursor includes a portion indicating that the query cursor is exclusive (e.g., for a select distinct query with a logical relationship of AND between filters where a match has been found in all but one of the index portions, or for a select distinct query with a logical relationship of OR between filters) the first portion of the current value of the query cursor is updated if a match is found in a next index portion.

In some embodiments, upon determining that the first candidate value combination is (756) different from a predefined portion (e.g., the first portion), corresponding to the one more properties, of the current value of the query cursor, Datastore Server 106 sets (758) the predefined portion of the current value of the query cursor to the first candidate value combination. For example, as shown in FIG. 5C, when Datastore Server 106 identifies 'Bernie' as a candidate value from Index Portion 511-c, Datastore Server 106 updates the current value of the query cursor to 'Bernie' and proceeds to Index Portion 501-c to identify the next distinct value greater than or equal to the current value of the predefined portion of the query cursor (e.g., 'Bernie') in Index Portion 501-c. Similarly, when Datastore Server 106 finds 'Cathy' as the next candidate value in Index Portion 501-c, and makes a determination that 'Cathy' is different from the current value of the predefined portion of the query cursor (e.g., 'Bernie'), Datastore Server 106 sets the current value of the predefined portion of the query cursor to 'Cathy' (the identified candidate value in Index Portion 501-c).

In some embodiments, upon determining that the first candidate value combination is not (760) different from a predefined portion, corresponding to the one more properties, of the current value of the query cursor, Datastore Server 106 makes a determination as to whether there are more index portions to retrieve values from. In some implementations, upon determining that there are (762) more index portions to retrieve values from, Datastore Server 106 leaves (764) the predefined portion of the current value of the query cursor unchanged. For example, if the logical relationship specified by the query is Boolean AND and five index portions are used for query-execution, if a common or matching candidate value is obtained from both the first and second index portions (out of the five index portions) searched, Datastore Server 106 makes a determination that more index portions need to be searched, since, in this situation, the matching value combination must be found in all five index portions to be identified as a distinct value combination and a valid search result. Consequently, in this example, Datastore Server 106 will not update the current value of the query cursor until the matching value combination is found in all five of the index portions or the matching value combination is found not to exist in at least one of the index portions. In some implementations, upon determining that there are not (766) more index portions to retrieve values from, Datastore Server 106 increments (768) the predefined portion of the current value of the query cursor in accordance with the predefined sort order.

In some embodiments, when the comparing candidate value combinations includes (770) comparing a first candidate value combination from a first index portion and a second candidate value combination from a second index portion (see operation 748), Datastore Server 106 identifies (772) the first candidate value combination as the distinct value combination. For example, Datastore Server 106 identifies the first candidate value combination as the distinct value combination by determining that the first candidate value combination is the smallest value combination in a set of candidate value combinations where the indexes are sorted in an increasing sort order and the logical relationship is an OR. As illustrated in FIG. 5D, Datastore Server 106 retrieves candidate values 'Cathy' and 'Bernie' from Index Portion 501-c and Index Portion 511-c, respectively, and compares (561-b) the retrieved candidate values 'Cathy' and 'Bernie' to identify 'Bernie' as a distinct candidate value since 'Bernie' precedes 'Cathy' in the sort order (e.g., Bernie comes before Cathy in alphabetical order). In some implementations, after identifying the first candidate value combination as the distinct value combination, Datastore Server 106 increments (774) the predefined portion of the current value of the query cursor in accordance with the predefined sort order. In some implementations, a value is 'nominally' greater than the first candidate value combination when the value is greater than the first candidate value combination by a small amount (e.g., an amount that is less than or equal to the smallest permitted step size between two subsequent value combinations). For example, the current value of the query cursor is set to be the first candidate value combination plus the null character.

In some embodiments, Datastore Server 106 makes a determination as to whether a termination condition has been met. For example, Datastore Server 106 makes a determination as to whether at least a respective distinct value combination has been identified. Upon determining that a termination condition has not (776) been met, Datastore Server 106 repeats (778) the retrieving candidate value combinations and the comparing candidate value combinations one or more times for the set of index portions until at least a respective distinct value combination has been identified (or the termination condition is met). For example, Datastore Server 106 returns to operation 726.

In some embodiments, upon determining that a termination condition has (780) been met or after identifying at least one distinct value combination, Datastore Server 106 transmits (782) information corresponding to the respective distinct value combination to the requestor. In some embodiments, the information corresponding to the respective distinct value combination includes (784) a representation of the respective distinct value combination (e.g., names of lawyers in California in the example shown in FIGS. 5C-5D). In some embodiments, retrieving the candidate value combinations includes (786), for a particular candidate value combination retrieved from a particular index entry, retrieving information specific to an entity corresponding to the particular index entry (e.g., retrieving an entity key or an age of the first lawyer with each distinct name in the example shown in FIGS. 5C-5D). In some embodiments, the particular candidate value combination is identified as the respective distinct value combination. In some embodiments, the information corresponding to the respective distinct value combination includes information specific to the entity corresponding to the particular index entry from which the respective distinct value combination was retrieved (e.g., an entity name, an entity last modification date or the entire entity).

In some embodiments, the information corresponding to the respective distinct value combination includes the entity for each distinct value combination. In the example shown in FIG. 5C, the query may request Datastore Server 106 to return, for each distinct value of 'Name' in Index Portion 501-c, the first entity when sorted by 'Age.' The results would then correspond to entities with Keys 4, 5, 46, 20, 132, and so on. A more specific example of retrieving information specific to entities corresponding to index entries identified while performing a select distinct query includes finding a name of the highest scoring player for each game in an online gaming site. To generate this result, Datastore Server 106 could execute a query corresponding to "Select Distinct: Game ID, Sort Order=Game Score, Descending" with result display parameters including "Return Username for identified Index Entries." In this example, the search query above would result in identifying a Username for the first index entry in an index portion sorted by game score (descending) for each unique game.

It should be understood that the particular order in which the operations in FIGS. 7A-7H have been described is merely an example and is not intended to indicate that the described order is the only order in which the operations could be performed. One of ordinary skill in the art would recognize various ways to reorder the operations described herein. Additionally, it should be noted that details of other processes described herein with respect to method 600 (described herein with reference to FIG. 6) are also applicable in an analogous manner to method 700 described above with respect to FIGS. 7A-7H. For example, the entities, index(es), index portion(s), queries, and responses described above with reference to method 700 optionally have one or more of the characteristics of the various entities, index(es), index portion(s), queries, and responses described herein with reference to method 600. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method comprising:
   at a respective server system having one or more processors and memory storing one or more programs that when executed by the one or more processors cause the respective server system to perform the method, the method comprising:
   receiving, from a requestor, a select distinct query for retrieving information corresponding to distinct value combinations of one or more properties for entities satisfying requestor-specified filter criteria;
   in response to the query:
      identifying a set of index portions including two or more index portions in accordance with the requestor-specified filter criteria, wherein index entries in each respective index portion in the set of index portions are sorted in a predefined sort order in accordance with value combinations of the one or more properties;
      identifying one or more distinct value combinations of the one or more properties for entities satisfying the requestor-specified filter criteria, wherein the identifying includes:
         obtaining an initial value of a query cursor as a current value of the query cursor, wherein the initial value of the query cursor indicates locations in each of the two or more index portions corresponding to a first value of the one or more properties;
         retrieving two or more candidate value combinations, including, for each respective index portion in the set of index portions, retrieving a respective candidate value combination of the one or more properties at an index location that is equal or sequentially adjacent, in the respective index portion, to the current value of the query cursor;
         comparing the respective candidate value combinations so as to identify distinct value combinations, if any, from the plurality of respective candidate value combinations in accordance with the query; and;
         updating the current value of the query cursor based on one of the retrieved candidate value combinations and repeating the retrieving candidate value combinations and the comparing candidate value combinations one or more times for the set of index portions until a termination condition has been met; and
      transmitting information corresponding to the identified one or more distinct value combinations to the requestor.

2. The method of claim 1, wherein the information corresponding to the identified one or more distinct value combinations includes a representation of the identified one or more distinct value combinations.

3. The method of claim 1, wherein:
   the retrieving candidate value combinations includes, for a particular candidate value combination retrieved from a particular index entry, retrieving information specific to an entity corresponding to the particular index entry;
   the particular candidate value combination is identified as the identified one or more distinct value combinations; and
   the information corresponding to the identified one or more distinct value combinations includes information specific to the entity corresponding to the particular index entry from which the identified one or more distinct value combinations were retrieved.

4. The method of claim 1, wherein:
   the one or more properties consist of a single respective property; and
   the one or more distinct value combinations correspond to distinct values of the respective property.

5. The method of claim 1, wherein:
   the one or more properties include a plurality of properties; and
   the one or more distinct value combinations include at least two different value combinations that both include a same distinct value of a respective property.

6. The method of claim 1, wherein:
   the requestor-specified filter criteria specify a plurality of operands including a first operand associated with one or more filters, a second operand associated with one or more filters and a logical relationship between the plurality of operands; and
   identifying the set of index portions in accordance with the requestor-specified filter criteria includes:
      identifying one or more index portions corresponding to the one or more filters of the first operand; and
      identifying one or more index portions corresponding to the one or more filters of the second operand.

7. The method of claim 6, wherein the comparing candidate value combinations is performed in accordance with the logical relationship between the plurality of operands specified in the requestor-specified filter criteria.

8. The method of claim 1, wherein the retrieving candidate value combinations includes traversing at least one respective index portion in the set of index portions in the predefined sort order starting at the current value of the query cursor for the one or more properties.

9. The method of claim 1, wherein:
   the set of index portions includes a first index portion and a second index portion; and
   the retrieving candidate value combinations includes:
      retrieving, from the first index portion, a first candidate value combination for the one or more properties that is equal or sequentially adjacent, in the first index portion, to the current value of the query cursor;

retrieving, from the second index portion, a second candidate value combination for the one or more properties that is equal or sequentially adjacent, in the second index portion, to the current value of the query cursor;

the comparing candidate value combinations includes:

comparing the first candidate value combination and the second candidate value combination so as to identify distinct value combinations, if any, from the first candidate value combination and the second candidate value combination in accordance with the query.

10. The method of claim 9, wherein updating the current value of the query cursor includes:

determining whether the first candidate value combination is different from a predefined portion, corresponding to the one more properties, of the current value of the query cursor; and in accordance with a determination that the first candidate value combination is different from the predefined portion of the current value of the query cursor, setting the predefined portion of the current value of the query cursor to the first candidate value combination.

11. The method of claim 9, wherein updating the current value of the query cursor includes:

identifying the first candidate value combination as the distinct value combination; and after identifying the first candidate value combination as the distinct value combination, incrementing the predefined portion of the current value of the query cursor in accordance with the predefined sort order.

12. The method of claim 1, wherein, retrieving the respective candidate value combinations includes, for each respective index portion:

retrieving a respective index entry having a first section and a second section, wherein the first section includes a respective value for each of the one or more properties and the second section includes a respective value for each of one or more additional properties used to sort index entries within the respective index portion; and identifying a combination of the respective values in the first section of the respective index entry as the candidate value combination for the respective index portion.

13. The method of claim 1, wherein identifying the distinct value combinations includes sequentially identifying the distinct value combinations in the predefined sort order.

14. The method of claim 1, wherein:

the set of index portions includes a first index portion and a second index portion;

the retrieving candidate value combinations includes:

retrieving, from the first index portion, a first batch of value combinations, wherein the first batch includes a plurality of consecutive value combinations from the first index portion;

identifying a first set of one or more candidate value combinations from the first batch of value combinations;

retrieving, from the second index portion, a second batch of value combinations, wherein the second batch includes a plurality of consecutive value combinations from the second index portion; and identifying a second set of one or more candidate value combinations from the second batch of value combinations; and the comparing candidate value combinations includes comparing one or more candidate value combinations from the first set of candidate value combinations with one or more candidate value combinations from the second set of candidate value combinations in accordance with the query.

15. The method of claim 14, wherein the first batch of value combinations and the second batch of value combinations each include N value combinations, where N is a predefined integer greater than one.

16. The method of claim 14, wherein the first set of one or more candidate value combinations includes a plurality of candidate value combinations.

17. A server system, comprising:

one or more processors;

memory; and one or more programs, wherein the one or more programs are stored in the memory and configured to be executed by the one or more processors, the one or more programs including instructions for:

receiving, from a requestor, a select distinct query for retrieving information corresponding to distinct value combinations of one or more properties for entities satisfying requestor-specified filter criteria;

in response to the query:

identifying a set of index portions including two or more index portions in accordance with the requestor-specified filter criteria, wherein index entries in each respective index portion in the set of index portions are sorted in a predefined sort order in accordance with value combinations of the one or more properties;

identifying one or more distinct value combinations of the one or more properties for entities satisfying the requestor-specified filter criteria, wherein the identifying includes:

obtaining an initial value of a query cursor as a current value of the query cursor, wherein the initial value of the query cursor indicates locations in each of the two or more index portions corresponding to a first value of the one or more properties;

retrieving two or more candidate value combinations, including, for each respective index portion in the set of index portions, retrieving a respective candidate value combination of the one or more properties at an index location that is equal or sequentially adjacent, in the respective index portion, to the current value of the query cursor;

comparing the respective candidate value combinations so as to identify distinct value combinations, if any, from the respective candidate value combinations in accordance with the query; and updating the current value of the query cursor based on one of the retrieved candidate value combinations and repeating the retrieving candidate value combinations and the comparing candidate value combinations one or more times for the set of index portions until a termination condition has been met; and transmitting information corresponding to the identified one or more distinct value combinations to the requestor.

18. The system of claim 17, wherein:

the set of index portions includes a first index portion and a second index portion;

the instructions for retrieving candidate value combinations includes instructions for:

retrieving, from the first index portion, a first batch of value combinations, wherein the first batch includes a plurality of consecutive value combinations from the first index portion;

identifying a first set of one or more candidate value combinations from the first batch of value combinations;

retrieving, from the second index portion, a second batch of value combinations, wherein the second batch includes a plurality of consecutive value combinations from the second index portion; and identifying a second set of one or more candidate value combinations from the second batch of value combinations; and the comparing candidate value combinations includes comparing one or more candidate value combinations from the first set of candidate value combinations with one or more candidate value combinations from the second set of candidate value combinations in accordance with the query.

19. A non-transitory computer readable storage medium storing one or more programs, the one or more programs comprising instructions, which when executed by a computer system with one or more processors, cause the computer system to:

receive, from a requestor, a select distinct query for retrieving information corresponding to distinct value combinations of one or more properties for entities satisfying requestor-specified filter criteria;

in response to the query:

identify a set of index portions including two or more index portions in accordance with the requestor-specified filter criteria, wherein index entries in each respective index portion in the set of index portions are sorted in a predefined sort order in accordance with value combinations of the one or more properties;

identify one or more distinct value combinations of the one or more properties for entities satisfying the requestor-specified filter criteria, wherein the identifying includes:

obtaining an initial value of a query cursor as a current value of the query cursor, wherein the initial value of the query cursor indicates locations in each of the two or more index portions corresponding to a first value of the one or more properties;

retrieving two or more candidate value combinations, including, for each respective index portion in the set of index portions, retrieving a respective candidate value combination of the one or more properties at an index location that is equal or sequentially adjacent, in the respective index portion, to the current value of the query cursor;

comparing the respective candidate value combinations so as to identify distinct value combinations, if any, from the respective candidate value combinations in accordance with the query; and updating the current value of the query cursor based on one of the retrieved candidate value combinations and repeating the retrieving candidate value combinations and the comparing candidate value combinations one or more times for the set of index portions until a termination condition has been met; and transmit information corresponding to the identified one or more distinct value combinations to the requestor.

20. The non-transitory computer readable storage medium of claim 19, wherein the set of index portions includes a first index portion and a second index portion;

the instructions for retrieving candidate value combinations includes instructions for:

retrieving, from the first index portion, a first batch of value combinations, wherein the first batch includes a plurality of consecutive value combinations from the first index portion;

identifying a first set of one or more candidate value combinations from the first batch of value combinations;

retrieving, from the second index portion, a second batch of value combinations, wherein the second batch includes a plurality of consecutive value combinations from the second index portion; and identifying a second set of one or more candidate value combinations from the second batch of value combinations; and the comparing candidate value combinations includes comparing one or more candidate value combinations from the first set of candidate value combinations with one or more candidate value combinations from the second set of candidate value combinations in accordance with the query.

* * * * *

UNITED STATES PATENT AND TRADEMARK OFFICE
CERTIFICATE OF CORRECTION

| | |
|---|---|
| PATENT NO. | : 9,342,553 B1 |
| APPLICATION NO. | : 13/892215 |
| DATED | : May 17, 2016 |
| INVENTOR(S) | : Fuller |

Page 1 of 1

It is certified that error appears in the above-identified patent and that said Letters Patent is hereby corrected as shown below:

In the claims,

Claim 1, column 28, line 1, please delete "the plurality of respective" and insert --the respective--.

Signed and Sealed this
Second Day of August, 2016

Michelle K. Lee
*Director of the United States Patent and Trademark Office*